US007937057B2

(12) United States Patent
Kishigami et al.

(10) Patent No.: US 7,937,057 B2
(45) Date of Patent: May 3, 2011

(54) RADIO COMMUNICATION DEVICE

(75) Inventors: Takaaki Kishigami, Tokyo (JP); Naoki Adachi, Kanagawa (JP); Yoichi Nakagawa, Tokyo (JP); Hidekuni Yomo, Tokyo (JP); Shutai Okamura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 555 days.

(21) Appl. No.: 12/063,203

(22) PCT Filed: Oct. 5, 2006

(86) PCT No.: PCT/JP2006/319997
§ 371 (c)(1),
(2), (4) Date: Feb. 7, 2008

(87) PCT Pub. No.: WO2007/040268
PCT Pub. Date: Apr. 12, 2007

(65) Prior Publication Data
US 2008/0293371 A1        Nov. 27, 2008

(30) Foreign Application Priority Data

Oct. 5, 2005   (JP) .................. 2005-292504
Sep. 29, 2006  (JP) .................. 2006-269287

(51) Int. Cl.
*H04B 1/06*        (2006.01)
(52) U.S. Cl. .............. 455/278.1; 455/272; 455/277.1; 455/277.2; 455/269
(58) Field of Classification Search ........... 455/278.1, 455/272, 277.1, 277.2, 269
See application file for complete search history.

(56) References Cited

U.S. PATENT DOCUMENTS
5,203,023 A * 4/1993 Saito et al. ................. 455/133
(Continued)

FOREIGN PATENT DOCUMENTS
JP    06-204902                        7/1994
(Continued)

OTHER PUBLICATIONS
International Search Report Dated Jan. 9, 2007.
(Continued)

*Primary Examiner* — Sanh D Phu
(74) *Attorney, Agent, or Firm* — Pearne & Gordon LLP

(57) ABSTRACT

A spatial filtering adaptable for an interference wave that appears unsteadily can be implemented and also an interference canceling ability can be increased even in a condition that the interference wave does not steadily exist. At a time of non-active communication, the signals from a plurality of interference source radio communication devices 2 are received in advance by an interference signal receiving section 6 as the pre-process mode, then a resultant interference correlation matrix RI is stored in a storing section 7, and then an interference wave receiving antenna weight WI used to receive selectively the transmission signals from the interference source radio communication devices 2 is prepared based on the resultant interference correlation matrix RI. At a time of communication, the operation goes to the receiving process mode to normally receive the signal by a signal separating section 9, and a variation of the interference wave component is detected by an interference wave level detecting section 8 based on a signal power received using the interference wave receiving antenna weight WI. When the interference wave appears or changes, a desired wave separating/receiving antenna weight used to reduce the interference by using a new interference correlation matrix is changed adaptively.

21 Claims, 11 Drawing Sheets

U.S. PATENT DOCUMENTS

| | | |
|---|---|---|
| 6,765,898 B1 | 7/2004 | Bloch |
| 7,042,869 B1 * | 5/2006 | Bender .................. 370/349 |
| 7,057,573 B2 * | 6/2006 | Ohira ..................... 343/817 |
| 2005/0181831 A1 * | 8/2005 | Doi ....................... 455/562.1 |

FOREIGN PATENT DOCUMENTS

| | | |
|---|---|---|
| JP | 9-219615 | 8/1997 |
| JP | 2001-127679 | 5/2001 |
| JP | 2002-368663 | 12/2002 |

OTHER PUBLICATIONS

Foschini, Gerard J. "Layered Space-Time Architecture for Wireless Communication in a Fading Environment When Using Multi-Element Antennas"; Bell Labs Technical Journal; 1996.

* cited by examiner

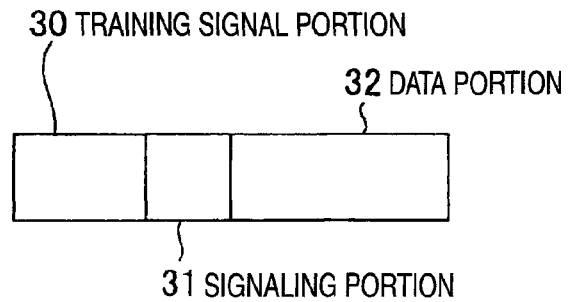
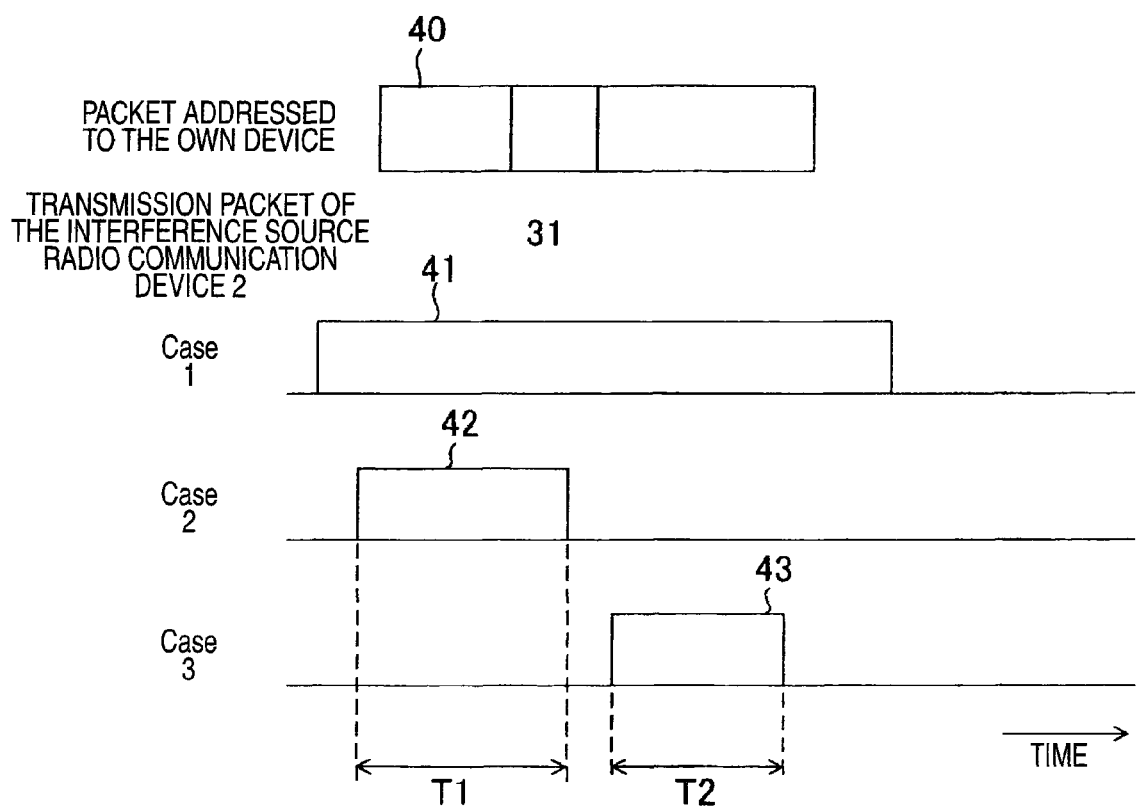

RADIO COMMUNICATION DEVICE

TECHNICAL FIELD

The present invention relates to a radio communication device that is used as a terminal of a radio communication system having such a multicell configuration that a plurality of terminals share the same channel with each other, or the like, for example, and is capable of receiving a desired signal by suppressing an interference component transmitted from an interference wave source.

BACKGROUND ART

In recent years, the demand for an increase in capacity and an increase in speed of a radio communication shows a great rise, and researches on the method of improving further an effective utilization efficiency of finite frequency resources are done eagerly. As one method of them, the approach for utilizing a spatial domain commands public attention. One of the technologies to utilize a spatial domain is the adaptive array antenna (adaptive antenna). This adaptive antenna can receive strongly a desired signal arriving from the desired direction by adjusting an amplitude and a phase by means of a weighting factor (this weighting factor is referred to as a "weight" hereinafter) by which the received signal is multiplied, and can suppress an interference component signal such as a multipath interference, a co-channel interference, or the like. A channel capacity of the communication system can be improved by such interference suppressing effect.

Also, as another technology utilizing a spatial domain, there is the space division multiplexing (abbreviated as "SDM" hereinafter) technology to transmit different data sequences to the same terminal through the physical channel with the same symbol at the same time and the same frequency by utilizing a spatial orthogonality on the channel. The SDM technology is given as an information disclosure in Non-Patent Literature 1, for example. The SDM transmission can be implemented in a propagation environment in which a correlation of the received signal between the antennas is low, by providing a plurality of antenna elements to both a transmitter and a receiver. In this case, the transmitter transmits different data sequences through the physical channel with the same symbol at the same time and the same frequency from plural antennas every antenna element, while the receiver separates signals received through plural antennas provided to the receiver based on the estimate value of the channel characteristic and receives the signals. As a result, an increase in speed of the transmission can be attained by using a plurality of SDM channels without a multilevel modulation. In the case where the SDM transmission is carried out, when the transmitter and the receiver are equipped with antennas in the same number, an increase of channel capacity that is proportional to the number of antennas can be achieved in an environment in which a large number of diffusion bodies exist between the transmitter and the receiver in sufficient S/N (signal to noise ratio) condition.

Non-Patent Literature 1: G. J. Forschini, "Layered space-time architecture for wireless communication in a fading environment when using multi-element antennas", Bell Labs Tech. J., pp. 41-59, autumn 1996

DISCLOSURE OF THE INVENTION

Problems that the Invention is to Solve

In the interference suppression in the above adaptive array antenna and the above SDM technology, the spatial filtering process for multiplying the signals that are received by a plurality of antenna elements by the antenna weight and then synthesizing resultant signals to sum up them is applied. For example, the interference suppression operates in compliance with the MMSE (Minimum Mean Square Error) algorithm that maximizes SIR (Signal to Interference power Ratio), or the like. However, as the precondition of such interference suppressing approach, it is supposed that the interference signal as well as the desired signal should be present steadily. For this reason, particularly in the radio communication system such as the wireless LAN or the like using the packet transmission, the interference signal caused by the own cell and other cells appear and disappear like a burst, and the above precondition is not satisfied in some cases. In other words, the above spatial filtering process has such a problem that, when the interference signal is varied after the algorithm of the spatial filtering process was applied, such process cannot effectively achieve the interference suppression.

The present invention has been made in view of the above circumstances, and it is an object of the present invention to provide a radio communication device capable of implementing a spatial filtering adaptable for an interference wave that appears unsteadily and also increasing an interference canceling ability even in a condition that the interference wave does not steadily exist.

Means for Solving the Problems

A radio communication device of the present invention, includes an interference signal receiving section for receiving an interference signal containing an interference wave component by using an interference wave receiving antenna weight for receiving selectively a signal of the interference wave component; an interference wave level detecting section for detecting a signal level of the interference wave component from an output of the interference signal receiving section; and a signal separating section for changing a desired wave separating/receiving antenna weight used to receive a desired signal, based on the output of the interference signal receiving section.

According to this configuration, the desired wave separating/receiving antenna weight is changed based on the signal level of the interference wave component. Therefore, even in a condition that the interference wave does not steadily exist, a spatial filtering adaptable for an interference wave that appears unsteadily can be implemented and also an interference canceling ability can be increased.

Also, in the radio communication device of the present invention, the desired wave separating/receiving antenna weight is a weight that minimizes an interference wave received power.

Also, in the radio communication device of the present invention, the desired wave separating/receiving antenna weight is a weight that maximizes a signal to interference power ratio.

Also, in the radio communication device of the present invention, the desired wave separating/receiving antenna weight is a weight that minimizes an interference wave received power for k sub-arrays (k is smaller than N) out of N antennas.

Also, in the radio communication device of the present invention, the signal separating section includes a first weight multiplying portion for multiplying a weight to remove preferentially an interference signal from other station, and a second weight multiplying portion for multiplying an output of the first weight multiplying portion by a spatial multiplexing separating weight to separate a spatial multiplexing stream.

Also, in the radio communication device of the present invention, the signal separating section includes a first weight multiplying portion for multiplying a weight to remove preferentially an interference signal from other station, and a second weight multiplying portion for multiplying an output of the first weight multiplying portion by a maximal ratio combining weight to maximize a signal power.

Also, in the radio communication device of the present invention, when an output of the interference wave level detecting section exceeds a predetermined value, the signal separating section receives a desired signal and changes the desired wave separating/receiving antenna weight used to suppress the detected interference wave.

According to this configuration, when a signal level of the interference wave component exceeds a predetermined value, the desired wave separating/receiving antenna weight can be changed to the weight to suppress the interference wave component in excess of the predetermined value. Therefore, the desired wave can be received while suppressing sufficiently the interference wave even in a condition that the interference wave appears unsteadily.

Also, in the radio communication device of the present invention, the interference wave level detecting section detects a signal level of interference wave components from a plurality of interference sources.

According to this configuration, it is possible to detect the signal level of the interference wave components from a plurality of interference sources, prepare the interference wave receiving antenna weight with respect to a plurality of interference waves, change the desired wave separating/receiving antenna weight based on the detected level of a plurality of interference waves, and the like. Therefore, the interference wave that appears unsteadily can be suppressed sufficiently.

Also, in the radio communication device of the present invention, when the signal level of the interference wave components from the plurality of interference sources in an output of the interference wave level detecting section exceeds a predetermined value, the signal separating section receives the desired signal and changes the desired wave separating/receiving antenna weight in response to the signal level of the interference wave components to suppress a plurality of detected interference waves.

According to this configuration, when the signal level of the interference wave components from a plurality of interference sources exceeds the predetermined value, the desired wave separating/receiving antenna weight can be changed to the weight that can suppress the interference wave in response to the signal level of a plurality of interference wave components. Therefore, the desired wave can be received while suppressing sufficiently the interference wave even in a condition that the interference wave appears unsteadily.

Also, in the radio communication device of the present invention, the interference wave receiving antenna weight is a weight that maximizes an interference wave power with respect to a desired signal power.

According to this configuration, the interference signal can be selected/received adequately by employing the weight that maximizes the interference wave power vs the desired signal power as the interference wave receiving antenna weight.

Also, in the radio communication device of the present invention, the interference wave receiving antenna weight is a weight that maximizes a received power of a communication signal between the radio communication devices except a concerned radio communication device.

According to this configuration, the interference signal can be selected/received adequately by employing the weight that maximizes received power of the communication signal between the radio communication devices except the concerned radio communication device as the interference wave receiving antenna weight.

Also, in the radio communication device of the present invention, the interference signal receiving section calculates the interference wave receiving antenna weight that maximizes an interference wave power, by using a correlation matrix that is obtained from a receiving signal in a time interval in which no desired signal is contained.

According to this configuration, the interference wave receiving antenna weight used to receive selectively the interference wave is calculated based on the correlation matrix that is obtained from the receiving signal in a time interval in which no desired signal is contained.

Also, in the radio communication device of the present invention, the interference signal receiving section calculates the interference wave receiving antenna weight that maximizes an interference wave power, by using a correlation matrix that is obtained from a receiving signal in a predetermined time.

According to this configuration, the interference wave receiving antenna weight used to receive selectively the interference wave is calculated based on the correlation matrix that is obtained from the receiving signal in a predetermined time.

Also, in the radio communication device of the present invention, the interference signal receiving section decides one or plural interference wave receiving antenna weights based on a received result of the communication signal between the radio communication devices except a concerned radio communication device at a time of non-active communication of the concerned radio communication device.

According to this configuration, one or plural interference wave receiving antenna weights are decided by making a study beforehand based on the received result of the communication signal between the radio communication devices except the concerned radio communication device at a time of non-active communication. Therefore, individual interference waves can be received selectively.

Also, the radio communication device of the present invention further includes a storing section for storing interference wave receiving information to receive selectively the interference signal; wherein, when the receiving signal is a signal addressed to the radio communication device except the concerned radio communication device, the interference signal receiving section calculates the interference wave receiving information relating to the interference wave component and stores the information in the storing section.

According to this configuration, when the received signal is the signal addressed to the radio communication device except the concerned radio communication device, the process goes to the pre-process mode in which a preliminary study is made, or the like, for example. Thus, the interference wave receiving information concerning the interference wave component can be stored in the storing section, and then the interference wave receiving antenna weight used to receive selectively the interference wave can be generated based on the interference wave receiving information.

Also, in the radio communication device of the present invention, the interference signal receiving section calculates an interference correlation matrix of the interference wave as the interference wave receiving information, and receives the interference signal by using the interference wave receiving antenna weight generated based on the interference correlation matrix.

According to this configuration, the interference wave receiving antenna weight can be generated based on the interference correlation matrix of the interference wave, and individual interference waves can be selected/received adequately.

Also, in the radio communication device of the present invention, when the receiving signal is a signal addressed to the concerned radio communication device, the signal separating section separates the desired signal by using the desired wave separating/receiving antenna weight generated based on the interference correlation matrix.

According to this configuration, when the receiving signal is the signal addressed to the concerned radio communication device, the process goes to the receiving process mode to execute the normal reception, for example. Therefore, even in a condition that the interference wave appears unsteadily, the desired signal can be separated/received adequately by using the desired wave separating/receiving antenna weight, while sufficiently suppressing the interference wave by means of the interference wave selective reception using the interference wave receiving antenna weight.

Also, in the radio communication device of the present invention, the storing section stores the interference correlation matrix of the interference wave individually or the interference correlation matrix classified every sender individually, as the interference wave receiving information.

According to this configuration, the interference correlation matrix of the interference wave can be stored individually or the interference correlation matrixes of the interference waves classified every sender can be stored individually, and then the interference wave receiving antenna weight and the desired wave separating/receiving antenna weight can be generated/changed based on the interference correlation matrix. Therefore, the desired signal can be received while suppressing the interference wave that appears unsteadily up to the sufficient level.

Also, the radio communication device of the present invention further includes a transmitted replica generating portion for generating a replica of the transmitting signal based on a received result of the desired signal received by using the desired wave separating/receiving antenna weight; an interference canceling portion for canceling one desired signal or more from the receiving signal, based on an output of the transmitted replica generating portion; an iterative decoding weight generating portion for generating an iterative decoding weight to suppress the interference signal, by using a correlation matrix of the interference signal detected by the interference wave level detecting section; and a second signal separating section for multiplying an output of the interference canceling portion by the iterative decoding weight.

Also, the radio communication device of the present invention further includes a transmitted replica generating portion for generating a replica of the transmitting signal based on a received result of the desired signal received by using the desired wave separating/receiving antenna weight; an interference correlation matrix updating portion for extracting an interference signal component by canceling all desired signals from the receiving signal based on an output of the transmitted replica generating portion, and updating the correlation matrix of the interference signal detected by the interference wave level detecting section; an iterative decoding weight generating portion for generating an iterative decoding weight to suppress the interference signal, by using an output of the interference correlation matrix updating portion; and a second signal separating section for multiplying an output of the interference canceling portion by the iterative decoding weight.

Advantages of the Invention

According to the present invention, there is provided the radio communication device capable of implementing the spatial filtering adaptable for the interference wave that appears unsteadily and also increasing the interference canceling ability even in a condition that the interference wave does not steadily exist.

BRIEF DESCRIPTION OF THE DRAWINGS

FIG. 2 A view showing an example of a packet structure of a communication signal used in the present embodiment.

FIG. 3 A schematic view explaining a packet transmitting situation in the present embodiment.

Figure 1:
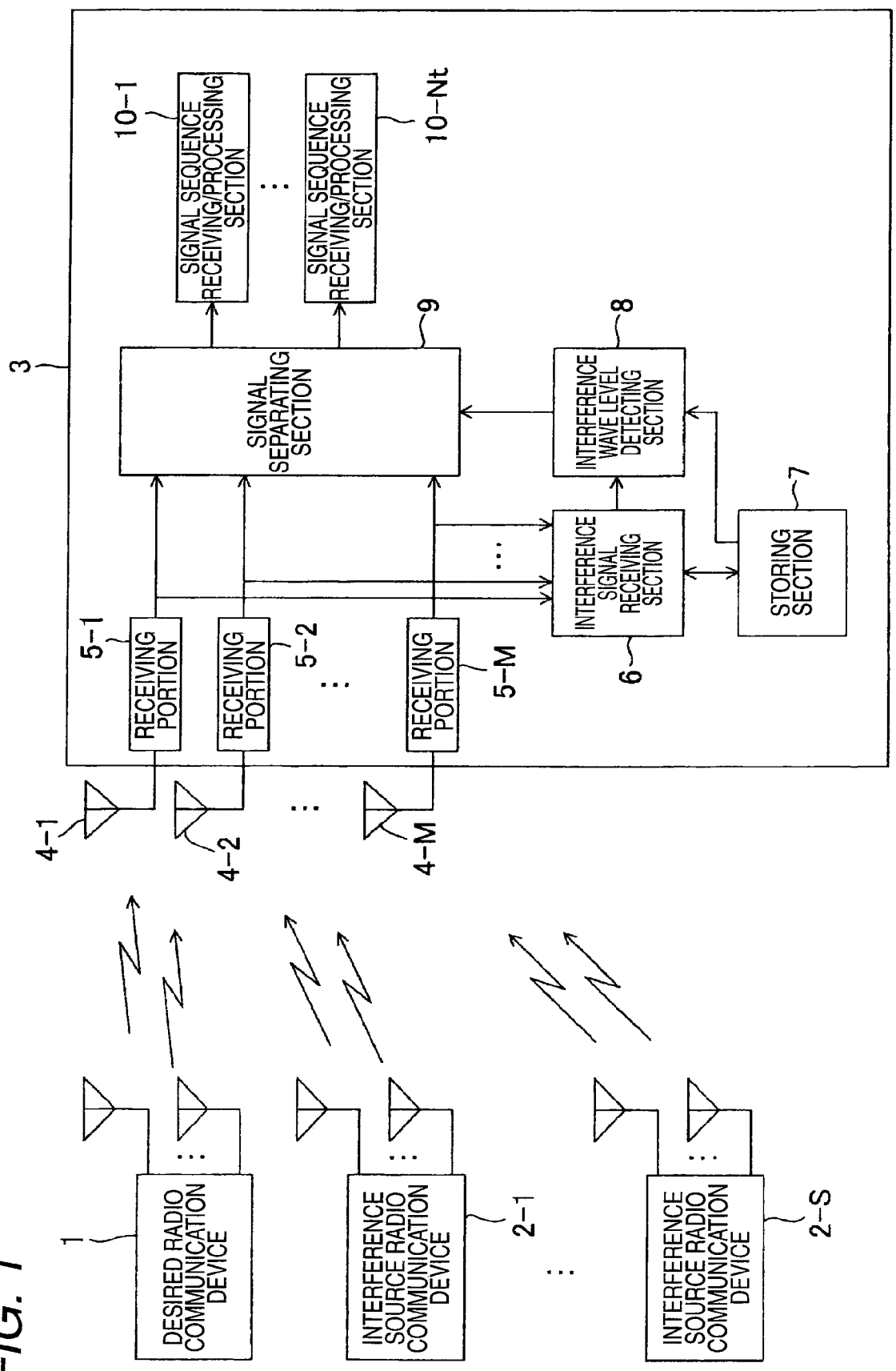
FIG. 1 A diagram showing a configuration of a radio communication system containing a radio communication device in a first embodiment of the present invention.

DESCRIPTION OF REFERENCE NUMERALS AND SIGNS 1 desired radio communication device
2, 2-1 to 2-S interference source radio communication device
3, 3a, 3b-1, 3b-2, 3b-3, 3e, 3f, 3g radio communication device
4, 4-1 to 4-M antenna
5, 5-1 to 5-M receiving portion
6, 61-fs interference signal receiving section
7, 62-fs storing section
8, 63 interference wave level detecting section
9, 9a, 64-fs signal separating section
10, 10-1 to 10-Nt signal series receiving/processing section
70 transmitted replica generating portion
71 interference canceling portion
72 iterative decoding weight generating portion
73, 73a second signal separating section
74-1 to 74-Nt second signal series receiving/processing section 80 interference correlation matrix updating portion
90 first weight multiplying portion
91 second weight multiplying portion
92-1, 92-2, 92-3 sub-array weight multiplying portion
95 re-channel estimating portion

BEST MODE FOR CARRYING OUT THE INVENTION

Embodiments of the present invention will be explained with reference to the drawings hereinafter.

First Embodiment

FIG. 1 is a diagram showing a configuration of a radio communication system containing a radio communication device 3 in a first embodiment of the present invention. Here, the case where a transmission signal is send out from a desired radio communication device 1 and interference source radio communication devices 2-1 to 2-S respectively and these transmission signals are received by a radio communication device 3 is illustrated. The desired radio communication device 1, the interference source radio communication devices 2-1 to 2-S, and the radio communication device 3 are equipped with a plurality of antennas, and can make the SDM transmission. The present embodiment is suitable for the radio communication system having the multicell configuration using the same channel repeatedly, and the like.

In FIG. 1, it is supposed that the radio communication device 3 receives the transmission signals sent out from the desired radio communication device 1 as a desired transmission signal source, and the interference source radio communication device 2-1 to 2-S as an interference source to cause the interference because these devices use the same or similar carrier frequency as or to that of the desired radio communication device 1. Here, only a receiving configuration of the radio communication device 3 is illustrated herein, and illustration of a transmitting configuration is omitted herein.

The radio communication device 3 is constructed to include a plurality (M) of antennas 4-1 to 4-M, receiving portions 5-1 to 5-M for applying an amplifying process, a filtering process, and a frequency converting process to the base band signal to respective high frequency signals received by a plurality of antenna 4-1 to 4-M and then picking out respective signals as a digital signal, an interference signal receiving section 6 for receiving selectively the interference signals from the interference source radio communication devices 2-1 to 2-S based on outputs of the receiving portion 5, a storing section 7 for storing interference wave receiving information used to receive selectively the interference signal, an interference wave level detecting section 8 for detecting a reception level of the interference wave based on an output of the interference signal receiving section 6, a signal separating section 9 for separating Nt (where Nt≧1) transmission signal sequences transmitted from the desired radio communication device 1 from the received signals received by a plurality of antennas 4, and signal sequence receiving/processing section 10-1 to 10-Nt for applying a demodulating process and a decoding process to the Nt separated signal sequences.

In the present embodiment, the communication signal in the packet transmission used in the wireless LAN, and the like is assumed as the transmission signal. FIG. 2 is a view showing an example of a packet structure of the communication signal. In FIG. 2, the packet transmitted as the transmission signal is composed of a training signal portion (preamble) 30 formed by the previously known signal sequence, a signaling portion 31, and a data portion 32. The training signal portion 30 is used in automatic gain control (AGC), frequency synchronization, symbol timing synchronization, equalization of a channel distortion, etc. in the amplifying process in the receiving portion 5. The signaling portion 31 contains information about identification signals peculiar to the sender and destination radio communication devices in the subsequent data portion 32, a coding ratio of the error correcting code, the number of levels of a multilevel modulation, and the like.

FIG. 3 is a schematic view explaining a packet transmitting situation, and shows transmission signal timings of the interference source radio communication devices 2 with respect to a packet 40 that is transmitted from the desired radio communication device 1 and addressed to the own device. The interference source radio communication devices 2 transmit a radio wave acting as a co-channel interference wave from their antennas respectively. In this case, the radio wave is not always transmitted from all interference source radio communication devices 2 but transmitted in different packet sizes at respective timings like a burst. In FIG. 3, an example in which, in Case 1, a transmission packet 41 of the interference source radio communication device 2 larger in size than the packet 40 addressed to the own device is transmitted and, in Case 2 and Case 3, transmission packets 42, 43 of the interference source radio communication devices 2 smaller in size than the packet 40 addressed to the own device are transmitted at different timings is illustrated.

More particularly, the case where the transmission packet 41 of the interference wave is present over a full period like Case 1, and the case where the transmission packets 42, 43 of the interference wave are present in a part of the period of the packet 40 addressed to the own device like Case 2 and Case 3. A state of the interference wave varies in a period T1 during which the transmission packet 42 is present and a period T2 during which the transmission packet 43 is present. In such a situation, the desired radio communication device 1 succeeds in receiving the packet addressed to the own device when a transmission situation of the co-channel interference wave from the interference source radio communication device 2 is within a range of the interference canceling ability of radio communication device 3, while the desired radio communication device 1 fails at receiving the packet and executes a re-transmitting operation when the transmission situation of the co-channel interference wave exceeds the interference canceling ability.

Figure 4:
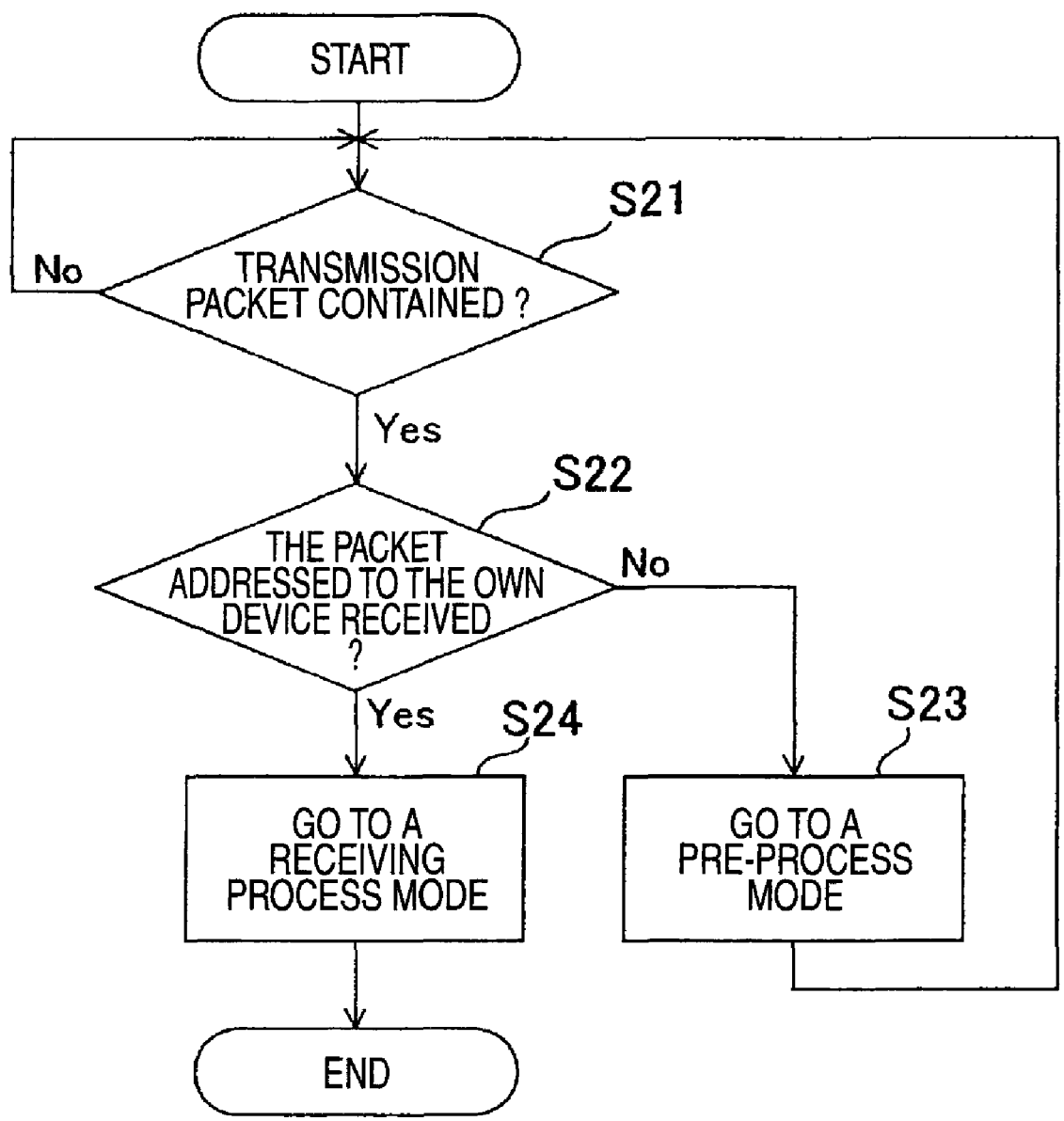
FIG. 4 A flowchart showing a receiving operation of the radio communication device in the present embodiment.

In the following, an operation of the radio communication device 3 will be explained with reference to FIG. 1 and FIG. 4 on the assumption that the transmission situation of the co-channel interference wave from the interference source radio communication device 2 is within a range of the interference canceling ability of radio communication device 3. FIG. 4 is a flowchart showing an operation of the radio communication device 3 in receiving the packet addressed to the own device. Here, the interference source occurs at random because the packet is transferred asynchronously between access points. For this reason, the receiving operation in FIG. 4 is executed repeatedly. The present invention is effective particularly for the case where a directivity of the interference wave, i.e., a spatial position, is substantially constant but the interference wave occurs unsteadily and changes with a time. The operation taken on the assumption of such case will be given hereunder. For example, such case corresponds to the case where respective communication devices operate in an autonomous distributed fashion like the wireless LAN, or the like and the packet is transmitted at random, and the like.

First, it is sensed whether or not the transmission packet is contained in the frequency channel to be used (S21). If the transmission packet is contained, a frequency synchronization and a timing synchronization are established by using the already known training signal contained in the training signal portion, and the sender and destination address information of the transmission packet contained in the signaling portion subsequent to the training signal are read by equalizing a channel distortion, and also it is sensed whether or not the packet addressed to the own device is received (S22). Here, if the packet other than the packet addressed to the own device is received, the received signal is the interference wave and thus the process goes to a pre-process mode to learn the interference signal (S23). In contrast, if the packet addressed to the own device is received, the process goes to a receiving process mode to receive the transmission signal (S24).

In the pre-process mode (S23), the interference signal receiving section 6 calculates an interference correlation matrix RI of the training signal portion, and stores this matrix in the storing section 7 as interference wave receiving information. Here, the interference correlation matrix $RI_n$ denotes the interference correlation matrix when the n-th packet other than the packet addressed to the own device is received, and is calculated by using the channel distortion (referred to as a "channel estimate value" hereinafter) $h_n(j,k)$ calculated by using the training signal. Where $h_n(j,k)$ denotes the channel estimate value applied when the signal is transmitted by the k-th antenna 4-$k$ of the n-th interference source radio communication device 2-$n$ and is received by the j-th antenna 4-$j$ of the radio communication device 3. Also, the n-th interference source radio communication device 2-$n$ has NIt(n) antennas, and NIt(n) is a natural number in excess of 1. When a flat fading channel is assumed, the interference correlation matrix $RI_n$ applied when the n-th packet other than the packet addressed to the own device is received is calculated by (Formula 1).

[Formula 1]

$$RI_n = B(n)B^H(n) + P_n E_M \quad (1)$$

Where B(n) is a M row and NIt(n) column matrix, and the element on the j-th row and the k-th column is $h_n(j,k)$. A superscript H denotes a vector adjoint operator. Also, $P_n$ denotes a noise power estimate value, and $E_M$ denotes a unit matrix of the M-th degree.

Here, as another calculating method of the interference correlation matrix RI, there is the method of calculating the matrix not to use the channel estimate value calculated by using the training signal. In this case, following (Formula 2) is employed.

[Formula 2]

$$RI_n = \frac{1}{Ns} \sum_{k=1}^{Ns} x(t_0 + k \times dt, n) x^H(t_0 + k \times dt, n) \quad (2)$$

Where x(t,n) is a column vector of the M-th degree, and the j-th element denotes a signal obtained by sampling the base band signal at a time t when the n-th packet other than the packet addressed to the own device is received by the j-th antenna 4-$j$ of the radio communication device 3. Also, dt denotes a sampling time interval, $t_0$ denotes a sampling start time, and Ns denotes the number of sampled data. In this case, since the interference correlation matrix RI can be calculated not to use the pilot signal, such matrix can be calculated by using the signal in the data portion. When the signal contained in the data portion is sufficiently long, the interference correlation matrix RI can be estimated with good accuracy.

The stored contents in the storing section 7 are updated by using the interference correlation matrix $RI_n$ obtained as above. As the updating approach, three approaches given as follows are employed solely or in combination.

1) To calculate the weighted mean interference correlation matrix. In this case, since the interference signal can be received by using an interference wave receiving antenna weight based on the weighted mean interference correlation matrix, the configurations of the interference signal receiving section 6 and the storing section 7 can be simplified. In contrast, the received signal based on a desired wave separating/receiving antenna weight using the weighted mean interference correlation matrix is received to result in the operation that receives the desired wave signal and suppresses always preferentially the interference signal being received at a dominant level in the pre-process mode, whereby individual interference signals cannot be suppressed to their optimal levels. As a result, this method is the universal type, but in some case the interference wave cannot be sufficiently suppressed.

2) To store the interference correlation matrix $RI_n$ individually as it is. When the number of stored interference correlation matrixes exceeds a predetermined number NI, the interference correlation matrix is stored up to the predetermined number NI in order of the interference correlation matrix $RI_k$ having a higher received power. Where k is a natural number of NI or less.

In this case, since the interference wave receiving antenna weight is provided to a plurality of interference correlation matrixes $RI_n$ to receive the interference signal, the configurations of the interference signal receiving section 6 and the storing section 7 become complicated. In contrast, the received signal based on the desired wave separating/receiving antenna weight using the weighted mean interference correlation matrix is received to result in the operation that receives the desired wave signal and suppresses respective interference signals being received at a dominant level in the pre-process mode to a sufficient level.

3) To classify the matrix RI every sender address information and store the interference correlation matrix $RI_n$ individually. When the interference correlation matrix of the same sender address is sensed in plural, they are stored after the weighted averaging process is done. Also, when the number of stored interference correlation matrixes exceeds the predetermined number NI, the interference correlation matrixes are preferentially up to the predetermined number NI while giving the preference to the sender address information of the interference correlation matrix $RI_k$ having a higher received power. Where k is a natural number of NI or less.

In this case, in addition to the advantages in 2), one interference correlation matrix can be stored in the storing section 7 to correspond to one sender. Accordingly, such a situation can be eliminated that a plurality of interference wave receiving antenna weights are provided to one sender to receive the interference signal, and thus complication of the configurations of the interference signal receiving section 6 and the storing section 7 caused due to such duplication can be avoided. Also, when a spatial variation of the sender is not caused, a noise component of the interference correlation matrix can be reduced because the averaging process is applied every common sender. As a result, the interference suppressing effect by the desired wave separating/receiving antenna weight using the interference correlation matrix can be enhanced. Therefore, this method can suppress the interference wave most effectively to a sufficient level.

Here, when the interference caused by the different type of communication system in such a way that the information in the signaling portion of the transmission packet cannot be read is present irrespective of the presence of the signal having an enough power level, the interference correlation matrix RI not using the channel estimate value derived by the training signal is calculated as given by above (Formula 2), then the storing section 7 is updated, and then process goes back to S21 to check whether or not the transmission packet is contained. Also, when a plurality of interference waves are present, the similar process is applied repeatedly to other interference waves.

The foregoing processes executed until the interference correlation matrix RI is stored when the packet other than the packet addressed to the own device is received correspond to the pre-process mode (S23).

Next, an explanation of the operation taken when the process goes to the receiving process mode (S24) will be made hereunder. Here, operations executed after the frequency synchronization, the phase synchronization, the symbol synchronization using the training signal in the training signal portion are established will be explained in the following. The high frequency signals received by a plurality of antennas 4 of the radio communication device 3 are subjected to the quadrature detection subsequent to the amplifying process, the filtering process, and the frequency converting process and then converted into the base band signals on an IQ plane by the receiving portions 5-1 to 5-M respectively. The base band signals are output as received signal vectors y(k) that are represented by a complex digital signal using an A/D converter. Here, k denotes a discrete time of the sampled signal.

In this case, the received signal vectors y(k) in the radio communication device 3 obtained via the flat fading channel at a discrete time k, which correspond to transmission sequence vectors $x(k)=[x_1(k), \ldots, x_{Nt}(k)]^T$ (a superscript T is a vector transposed operator) consisting of transmission sequences $x_n(k)$ that are transmitted from Nt antennas of the desired radio communication device 1 respectively, are given by following (Formula 3).

[Formula 3]

$$y(k)=H_1(k)x(k)+I(k)+n(k) \quad (3)$$

Where y(k) denote column vectors containing the received signals of the M antennas 4 used in reception as elements, and a signal $y_m(k)$ received by the antenna 4-$m$ denotes the m-th element. Also, $H_1$ denotes a channel response matrix showing a channel variation that the transmission sequence vectors x(k) of the desired radio communication device 1 undergo. Here, $H_1$ denotes a matrix consisting of (the number M of antennas of the radio communication device 3) rows and (the number Nt of transmission antennas of the desired radio communication device 1) columns. A matrix element $h_{ij}$ at the i-th row and the j-th column denotes a channel variation caused when the signal $x_j(k)$ transmitted from the j-th transmission antenna of the desired radio communication device 1 is received by the i-th antenna 4-$i$ of the radio communication device 3.

Also, n(k) denote noise component vectors attached when the transmission signals are received by the M antennas 4 of the radio communication device 3. Also, I(k) denote the interference signal components transmitted from one or plural the interference source radio communication devices 2-1 to 2-S. In this case, I(k)=0 when no transmission signal from the interference source radio communication device 2 is present.

Such received signal vectors y(k) of the radio communication device 3 are input into the interference signal receiving section 6 and the signal separating section 9.

The interference signal receiving section 6 reads one or plural interference correlation matrixes $RI_n$ obtained in the pre-process mode from the storing section 7, and calculates the interference wave receiving antenna weight vectors $WI_n$ that can receive the interference signal power I(k) selectively by the spatial filtering. In this case, when a plurality of interference correlation matrixes $RI_n$ are present, a plurality of outputs $z_n(k)$ are calculated and then the interference wave is specified by the interference wave level detecting section 8 described later using a threshold decision. The interference wave receiving antenna weight vector $WI_n$ gives the antenna weight to maximize the interference signal (get the maximum of SINR of the interference wave). Then, the n-th interference wave component signal $z_n(k)$ is extracted by executing a product-sum operation of the interference wave receiving antenna weight vector $WI_n$ and the received signal vectors y(k), as given by following (Formula 4).

[Formula 4]

$$z_n(k)=WI_n^H y(k) \quad (4)$$

Where n is a natural number of the number NI of interference correlation matrixes stored in the storing section 7, and $z_n(k)$ is formed of the column vector having elements in the number of spatial multiplexing streams that the interference source radio communication devices 2 transmit. Also, a superscript H denotes a vector adjoint operator. Here, the number of spatial multiplexing streams corresponds to the number of data streams in the situation that, for example, when the spatial multiplexing transmission is carried out based on MIMO (Multiple-Input Multiple-Output) in the next generation wireless LAN standard IEEE 801.11n, one signal (packet) is divided into a plurality of data streams and the data streams are multiplied spatially and transmitted.

At this time, the approach described as follow is applied to calculate the interference wave receiving antenna weight vector $WI_n$.

1) [Approach 1]: Following (Formula 5) is employed as the interference wave receiving antenna weight vector $WI_n$.

[Formula 5]

$$WI_n=U_k^{(n)} \quad (5)$$

Where $U_k^{(n)}$ has eigenvectors corresponding to the eigenvalues, which are picked up in descending order of size up to the number of spatial multiplexing streams that the interference source radio communication devices 2 transmitted, out of M eigenvalues that are obtained by eigen decomposing the interference correlation matrix $RI_n$ in terms of the eigenvalue as column vector components. Here, k=1, . . . , M. Accordingly, the interference wave can be received to maximize a power of the interference wave that has arrived at in producing the interference correlation matrix $RI_n$.

Also, another approach described as follow is applied by changing the operation of the storing section 7 to calculate the interference wave receiving antenna weight vector $WI_n$.

2) [Approach 2]: B(n) obtained in the pre-process mode is stored in the storing section 7 in place of the interference correlation matrix $RI_n$ obtained in the pre-process mode. In this case, following (Formula 6) is employed as the interference wave receiving antenna weight vector $WI_n$.

[Formula 6]

$$WI_n=D_n^{-1}B(n) \quad (6)$$

Where $D_n$ is calculated by following (Formula 7), $H_e$ is an estimate value of a channel response matrix $H_1$ that the transmission sequence x(k) of the desired radio communication device 1 undergo, $\delta$ is a noise power estimate value, and $E_M$ is a square matrix of the M-th degree (where M is the number of receiving antenna branches in the radio communication device 3). Accordingly, a power of the interference wave that has arrived at in producing the interference correlation matrix $RI_n$ can be received selectively while suppressing the desired signal.

[Formula 7]

$$D_n = H_e H_e^H + B(n)B^H(n) + \sigma E_M \quad (7)$$

In contrast, the signal separating section 9 separates/receives the receiving signal vector y(k) as the input by transforming the transmission sequence $x_n(k)$ transmitted from the desired radio communication device 1 into $WD_n^H y(k)$ while using the desired wave separating/receiving antenna weight $WD_n$. Here, n is a natural number of Nt or less, and Nt≧1. In other words, in the case of Nt=1, the signal separating section 9 executes the so-called diversity receiving operation and, in the case of Nt≧1, the signal separating section 9 executes the SDM receiving operation to separate/receive the transmission signal transmitted via the spatial multiplexing transmission. The desired wave separating/receiving operation made mainly by the signal separating section 9 will be explained hereunder.

Figure 5:
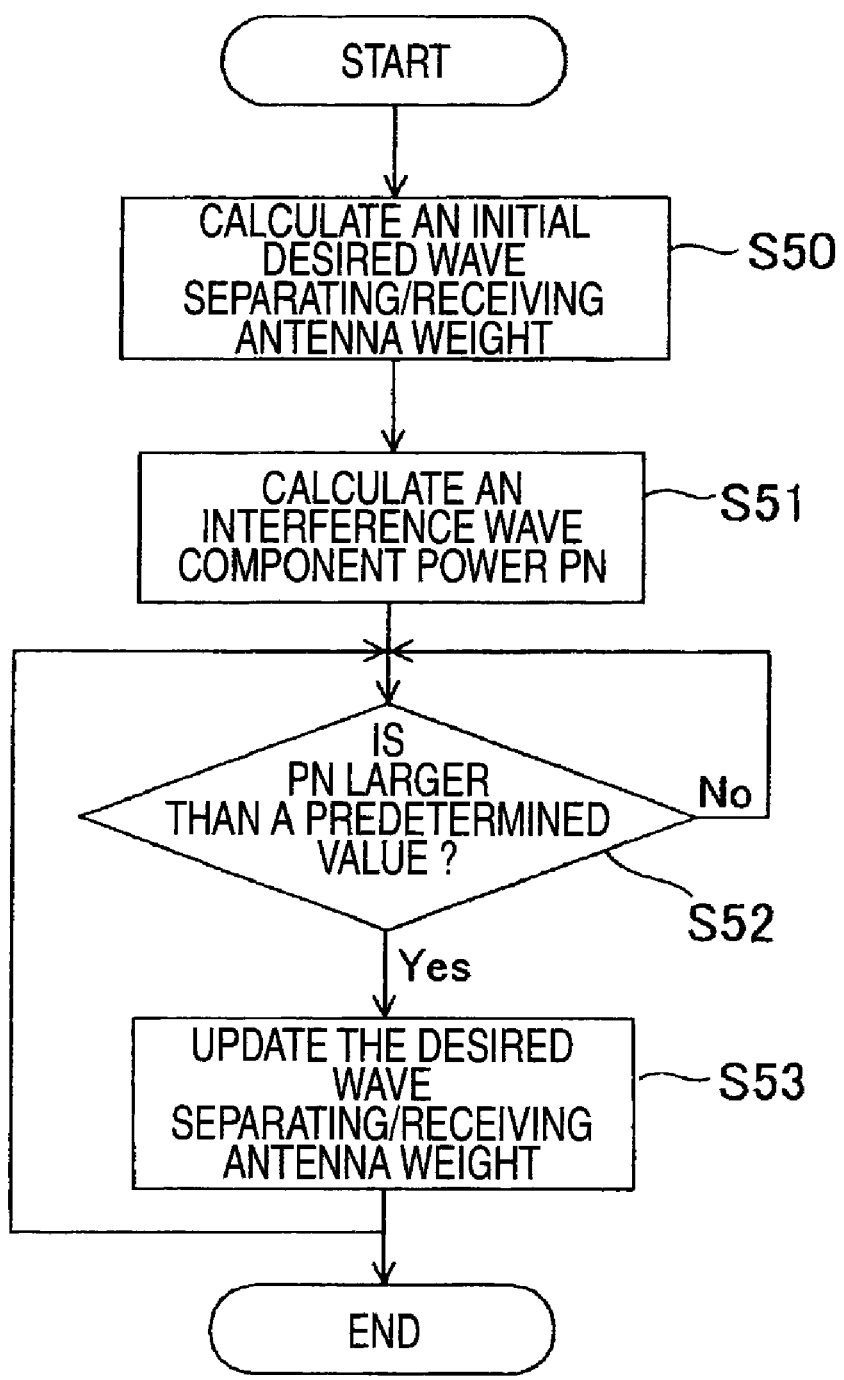
FIG. 5 A flowchart showing a desired wave separating/receiving operation in the present embodiment.

FIG. 5 is a flowchart showing operations including the signal separating section 9 and the interference wave level detecting section 8. Then, explanation of the operations will be made with reference to FIG. 5 hereunder.

First, an initial desired wave separating/receiving antenna weight WD is calculated by following (Formula 8) (S50). This desired wave separating/receiving antenna weight WD is the antenna weight to maximize the SINR of the desired wave.

[Formula 8]

$$WD = H_e R_n^{-1} \quad (8)$$

Here, WD consists of the matrix consisting of M rows and Nt columns, and the n-th column consists of $WD_n$. $R_n$ is calculated by following (Formula 9). Also, $H_e$ is an estimate value of a channel response matrix $H_1$ that the transmission sequence x(k) of the desired radio communication device 1 undergo, δ is a noise power estimate value, and $E_{Nt}$ is a square matrix of the Nt-th degree (where M is the number of receiving antenna branches in the radio communication device 3). Now, the estimate value $H_e$ of the channel response matrix $H_1$ and the noise power estimate value δ are obtained from the already known signal sequence in the training signal portion of the packet signal addressed to the own device.

[Formula 9]

$$R_n = H_e^H H_e + \sigma E_{Nt} \quad (9)$$

Here, the above approach is the signal separating approach based on the MMSE approach, but the above approach is not limited to this approach. Another approach such as ZF (Zero Forcing), MLD (Maximum Likelihood Detection), or the like may be applied.

Then, the interference wave level detecting section 8 detects an interference wave component power $P_n = \varsigma\varsigma z_n(k)$ $\varsigma\varsigma^2$ based on the output $z_n(k)$ of the interference signal receiving section 6 (S51). If the interference wave component power $P_n$ exceeds a predetermined value LI (S52:YES), the interference wave level detecting section 8 updates the desired wave separating/receiving antenna weight WD in the signal separating section 9 (S53). In contrast, if the interference wave component power $P_n$ does not exceed a predetermined value LI (S52:NO), the interference wave level detecting section 8 does not update the desired wave separating/receiving antenna weight WD in the signal separating section 9 and maintains the weight as it is. For example, as shown in FIG. 3, when the interference wave is caused like Case 1, Case 2, Case 3, the desired wave separating/receiving antenna weight WD may be changed between the periods T1 and T2 being generated sequentially.

When the interference wave level detecting section 8 updates the desired wave separating/receiving antenna weight WD, it calculates a new desired wave separating/receiving antenna weight WD given as follows and outputs the result to the signal separating section 9.

1) [Approach 3]: When above (Formula 5) is employed as the interference wave receiving antenna weight vector $WI_n$ in above [Approach 1], the desired wave separating/receiving antenna weight WD is updated based on following (Formula 10).

[Formula 10]

$$WD = W_b Q_n^{-1} \quad (10)$$

Where $W_b$ are calculated by following (Formula 11), $v_k^{(n)}$ are eigenvectors (where k=1, ..., Nt) corresponding to the eigenvalues when Nt eigenvalues are picked up in ascending order of size from the M eigenvalues that are obtained by eigen decomposing the interference correlation matrix $RI_n$ in terms of eigenvalue, and $Q_n$ is given by following (Formula 12). The desired wave separating/receiving antenna weight WD gives the antenna weight that maximizes a power of the desired wave and also suppresses the corresponding interference wave below a predetermined level. Accordingly, the desired signal can be received selectively while suppressing the interference wave caused in producing the interference correlation matrix $RI_n$. In this case, when a plurality of interference wave component powers ($P_{n0}, P_{n1}, ...$) that exceeds the predetermined value LI are present, the interference correlation matrix $RI_n (= a0 RI_{n0} + a1 RI_{n1} + ...)$ composed by adding the concerned interference correlation matrixes ($RI_{n0}$, $RI_{n1}, ...$) is employed (where $a_0, a_1, ...$ are the weighting factor). That is, the interference correlation matrix is composed by giving a weight every interference correlation matrix corresponding to each interference wave component.

[Formula 11]

$$W_b = [v_1^{(n)} ... v_{Nt}^{(n)}] \quad (11)$$

[Formula 12]

$$Q_n = (W_b H_e)^H W_b H_e + \sigma E_{Nt} \quad (12)$$

2) [Approach 4]: B(n) obtained in the pre-process mode is stored in the storing section 7 instead of the interference correlation matrix $RI_n$ obtained in the pre-process mode in above [Approach 2]. Also, when above (Formula 6) is employed as the interference wave receiving antenna weight vector $WI_n$, the desired wave separating/receiving antenna weight WD is updated based on following (Formula 13).

[Formula 13]

$$WD = W_b Q_n^{-1} \quad (13)$$

Where $W_b$ are calculated by following (Formula 14), $F_n$ are calculated by following (Formula 15), and $Q_n$ are calculated by following (Formula 16). Here, a constant a in (Formula 15) is a parameter used to vary the interference suppressing effect, and the space filtering operation puts a higher priority on an inference suppression rather than an increase of the desired wave received power as the constant a is increased. The desired wave separating/receiving antenna weight WD gives the antenna weight that maximizes a power of the desired wave and also suppresses the corresponding interference wave below a predetermined level. Accordingly, the desired signal can be received while suppressing the interference wave caused by producing the interference correlation matrix $RI_n$. In this case, when a plurality of interference wave component powers ($P_{n0}, P_{n1}, \ldots$) that exceeds the predetermined value LI are present, the correlation matrix $B(n)B^H(n)$ ($=a0B(n_0)B^H(n_0)+a1B(n_1)B^H(n_1)+\ldots$) composed by adding the correlation matrixes generated from the concerned interference channel response matrixes ($B(n_0), B(n_1), \ldots$) is employed (where $a_0, a_1, \ldots$ are the weighting factor). That is, the correlation matrix is composed by giving a weight every interference correlation matrix corresponding to each interference wave component.

[Formula 14]

$$W_b = F_n^{-1} H_e \quad (14)$$

[Formula 15]

$$F_n = (1-a) H_e H_e^H + a B(n) B^H(n) + \sigma E_M \quad (15)$$

[Formula 16]

$$Q_n = (W_b H_e)^H W_b H_e + \sigma W_b^H W_b \quad (16)$$

Figure 6:
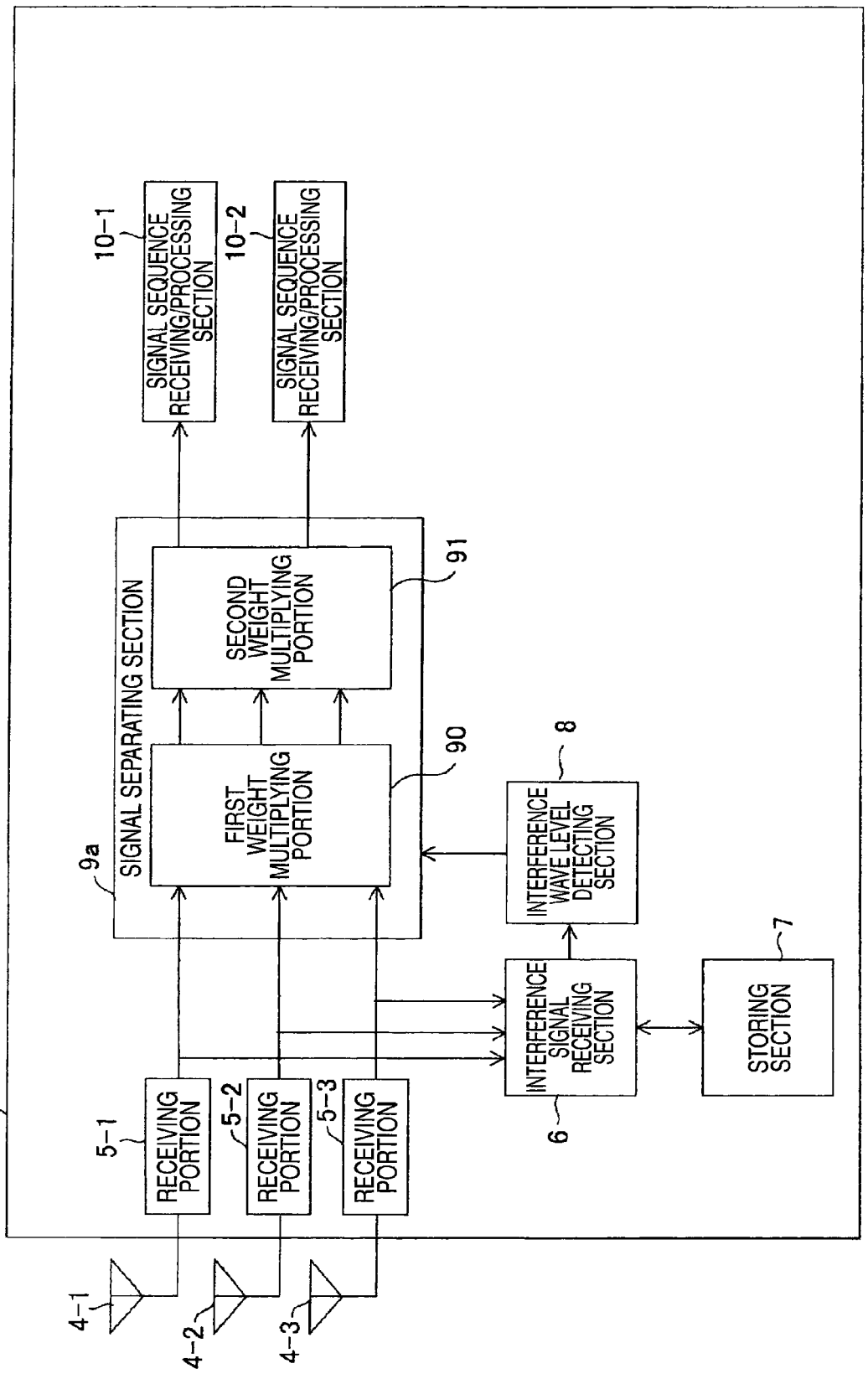
FIG. 6 A block diagram showing a configuration of a first variation of the radio communication device in the first embodiment.

Here, the signal separating section 9 may execute the multiplication of the desired wave separating/receiving antenna weight WD separately by two weight multiplying portions. An explanation of the configuration will be made hereunder. FIG. 6 is a block diagram showing a configuration of a first variation of the radio communication device that is constructed such that the signal separating section is separated into two weight multiplying portions. In a radio communication device 3b-1 of the first variation shown in FIG. 6, a signal separating section 9a is constructed to have a first weight multiplying portion 90 and a second weight multiplying portion 91.

A weight used in the first weight multiplying portion 90 is given by Wb in the desired wave separating/receiving antenna weight WD, as indicated by (Formula 10) or (Formula 13), and the receiving signal vector y(k) of the radio communication device 3b-1 is multiplied by the weight to get $A(k) = W_b^H y(k)$. The signal in which a received power of the interference wave contained in the receiving signal vector y(k) is suppressed can be obtained.

Then, a weight used in the second weight multiplying portion 91 is given by $(Q_n^{-1})^H$ in the desired wave separating/receiving antenna weight WD, as indicated by (Formula 10) or (Formula 13), and the output A(k) of the first weight multiplying portion 90 is multiplied by the weight to get $(Q_n^{-1})^H A(k)$. Accordingly, the Nt desired wave signals can be separated/received from the signal A(k) in which a received power of the interference wave contained in the receiving signal vector y(k) is suppressed.

Here, when the number of spatial multiplexing of the desired wave is 1, a maximal ratio combining weight that maximizes a signal power is used. Accordingly, the receiving quality can be enhanced by increasing the diversity effect when receiving the signal by a plurality of antenna.

In this manner, since the signal separating section 9a is constructed separately by two weight multiplying portions, the output signal A(k) in which the interference wave is suppressed can be output from the first weight multiplying portion 90. According to this characteristic, a configuration for calculating the channel estimate value again can be employed by using the signal in which the influence of the interference wave signal is reduced.

Figure 7:
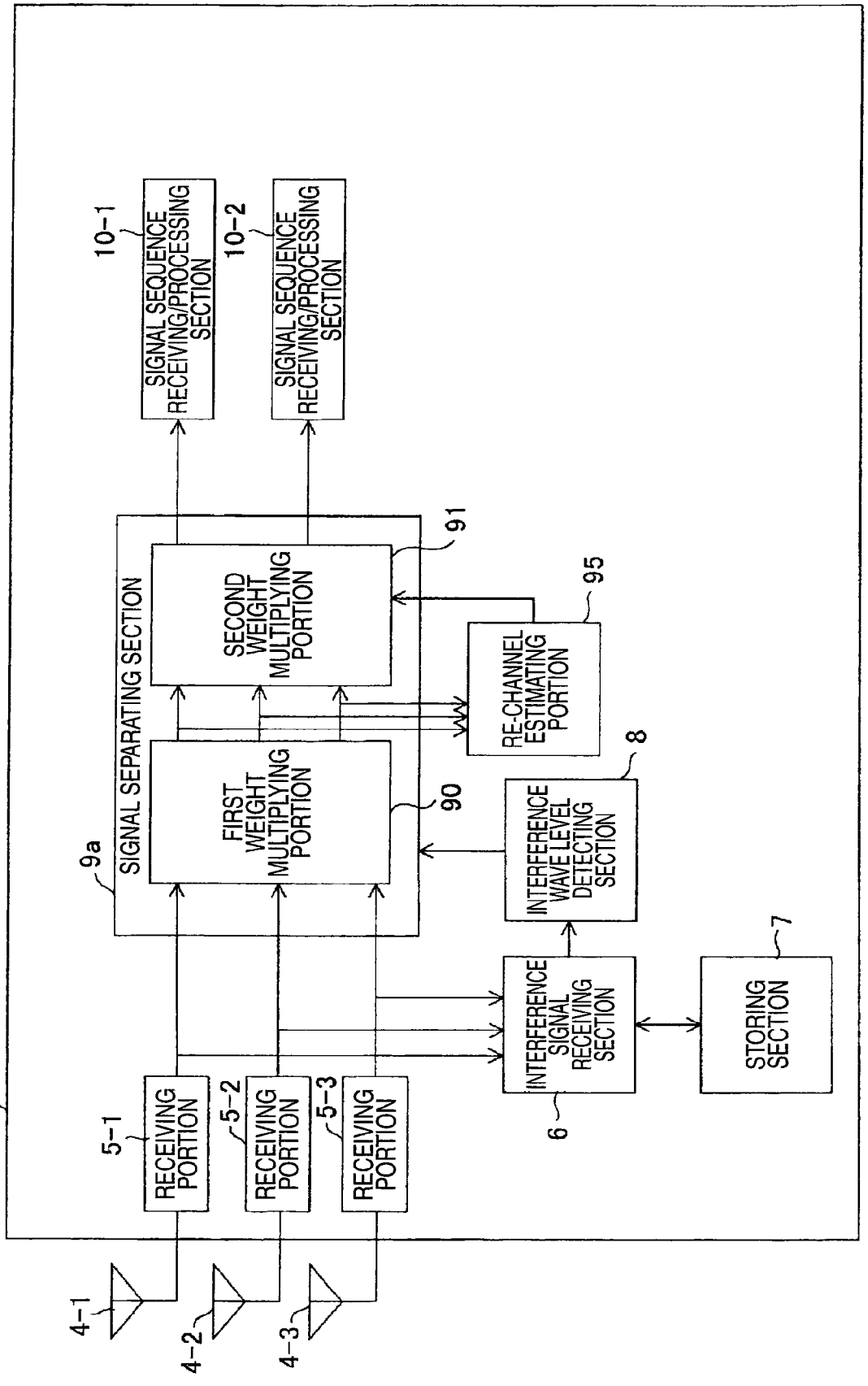
FIG. 7 A block diagram showing a configuration of a second variation of the radio communication device in the first embodiment.

FIG. 7 is a block diagram showing a configuration of a second variation of the radio communication device that is constructed such that the channel estimate value is calculated again. In a radio communication device 3b-2 of the second variation shown in FIG. 7, a re-channel estimating portion 95 extracts an already known pilot signal for channel estimation contained in the output signal A(k) in which the interference wave is reduced, and executes the channel estimation. The weight used in the second weight multiplying portion 91 is calculated by using the channel estimate value $H_r$ obtained from this process.

Here, in the case of [Approach 3], the re-channel estimating portion 95 calculates the desired wave separating/receiving weight by using $Q_n$ given by following (Formula 17) instead of (Formula 12), out of the above methods of updating the desired wave separating/receiving antenna weight WD. Also, in the case of [Approach 4], the re-channel estimating portion 95 calculates the desired wave separating/receiving weight by using $Q_n$ given by following (Formula 18) instead of (Formula 16).

[Formula 17]

$$Q_n = H_r^H H_r + \sigma E_{Nt} \quad (17)$$

[Formula 18]

$$Q_n = H_r^H H_r + \sigma W_b^H W_b \quad (18)$$

In this manner, because the channel estimate value is calculated by using the signal in which the interference wave signal component is reduced, the weight used to separate the desired wave can be derived more exactly. Accordingly, such an advantage can be achieved that a receiving quality of the desired wave can be improved.

Also, the weight used to suppress the interference wave received power may be produced by setting the weight in the first weight multiplying portion 90 into a set of k sub-arrays, where k is smaller than M that is the number of plural antennas.

Figure 8:
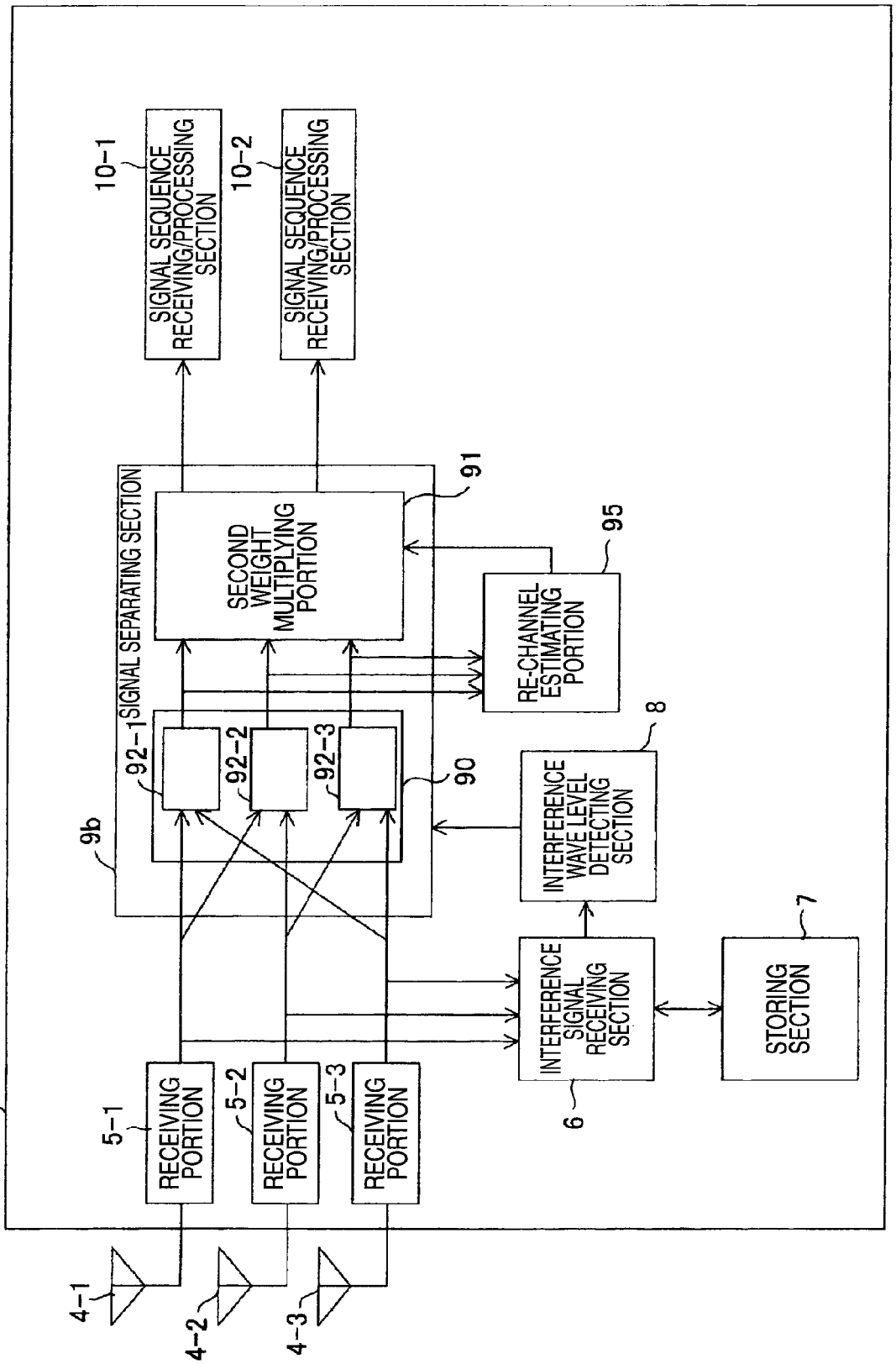
FIG. 8 A block diagram showing a configuration of a third variation of the radio communication device in the first embodiment.

FIG. 8 is a block diagram showing a configuration of a third variation of the radio communication device that is constructed such that the weight in the first weight multiplying portion of the signal separating section is provided as plural sets of sub-arrays. In a radio communication device 3b-3 of the third variation in FIG. 8, the first weight multiplying portion 90 contained in a signal separating section 9b has further a plurality of sub-array weight multiplying portions 92. In FIG. 8, an example of the case where, when the number of antennas is M=3, the sub-array antennas k=2 are constructed from the antennas M=3 is illustrated. In this case, since there are $3(={_3}C_2)$ ways of combining the sub-arrays, the first weight multiplying portion 90 has three sub-array weight multiplying portions 92-1 to 92-3. The generation of the m-th sub-array weight can be calculated in a manner that such weight is replaced with the matrix or the vector element relating to the concerned antenna number picked up in calculating $W_b$ given by (Formula 11) or (Formula 14).

In this manner, the eigen decomposition or the inverse matrix operation is contained in generating the weight $W_b$ to suppress the interference wave received power. In this case, such an advantage can be attained that, because the degree of the matrix is lowered by using the sub-array, a computational complexity can be reduced largely.

Then, the signal sequence receiving/processing section 10 executes the receiving process for restoring the transmission bit sequence, by applying a demapping process for converting the Nt output signals from the signal separating section 9 from the symbol data sequence based on a predetermined modulation system to the bit data sequence, a de-interleaving process for restoring the bit order by an opposite operation to the interleaving process applied on the transmission side, an error correcting/decoding process for correcting the error in the input bit data sequence, and the like to the Nt output signals from the signal separating section 9.

According to the operations described above, in the present embodiment, at a time of non-active communication, the signals are received in advance from a plurality of interference source radio communication devices 2 as the pre-process mode to get the interference correlation matrix RI, and then the interference wave receiving antenna weight WI used to receive selectively the transmission signals from the interference source radio communication devices 2 are prepared based on the resultant interference correlation matrix RI.

At a time of communication, the operation goes to the receiving process mode to normally receive the signal, and a variation of the interference wave component is detected based on the signal power received using the interference wave receiving antenna weight WI. Then, when the interference source radio communication device 2 for causing the interference appears or a variation of the interference wave component changes, the desired wave separating/receiving antenna weight WD used to reduce the interference by using the new interference correlation matrix can be changed adaptively.

Accordingly, the spatial filtering adaptable to the interference wave that appears unsteadily can be implemented, and stabilization of the communication quality can be achieved by enhancing the interference canceling ability. For example, even though the co-channel interference is caused unsteadily by the different interference wave sources, the stable receiving quality can be obtained.

Also, in the communication system using the wireless LAN, when the co-channel interference is caused by the hidden terminal or other BSS (Basic Service Set) that operates on a PCF (Point Coordination Function) basis, there is a risk that the interference signal transmitted from the undesired sender cannot be suppressed. In such case, if the present embodiment is applied, an interference resistance can be improved when the communication device suffers from the interference at such a level that the symbol synchronization can be established, and a transmission quality can be improved.

Also, as another simple approach when the desired wave separating/receiving antenna weight is changed, such an operation may be taken that a signal to interference power ratio SIR of the received signal y(n) is sensed and then the interference wave receiving antenna weight vector $WI_n$ is updated when a sensed value is in excess of a predetermined level. As the interference wave receiving antenna weight vector $WI_n$ at that time, the weight that gives the maximum of SIR is selected.

Also, as another calculating method of the interference correlation matrix RI, A) when a timing at which no signal is received is contained in the training signal in receiving the packet addressed to the own device, the interference correlation matrix may be calculated at this non-signal timing by using above (Formula 2). Accordingly, the interference correlation matrix of the interference source that causes the co-channel interference can be sensed with good accuracy in receiving the packet addressed to the own device.

Also, as still another calculating method of the interference correlation matrix RI, B) the correlation matrix obtained by using above (Formula 2) may be employed in the data portion in receiving the packet addressed to the own device. In this case, the correlation matrix is divided into a plurality of blocks in the data portion by shifting a calculating timing and a calculating range, and these blocks are employed as the interference correlation matrix RI. Accordingly, the interference correlation matrix of the interference source that causes the co-channel interference can be calculated while shifting a time in receiving the packet addressed to the own device, and as a result a tracking performance can be increased when the interference wave source varied in time.

Second Embodiment

Figure 9:
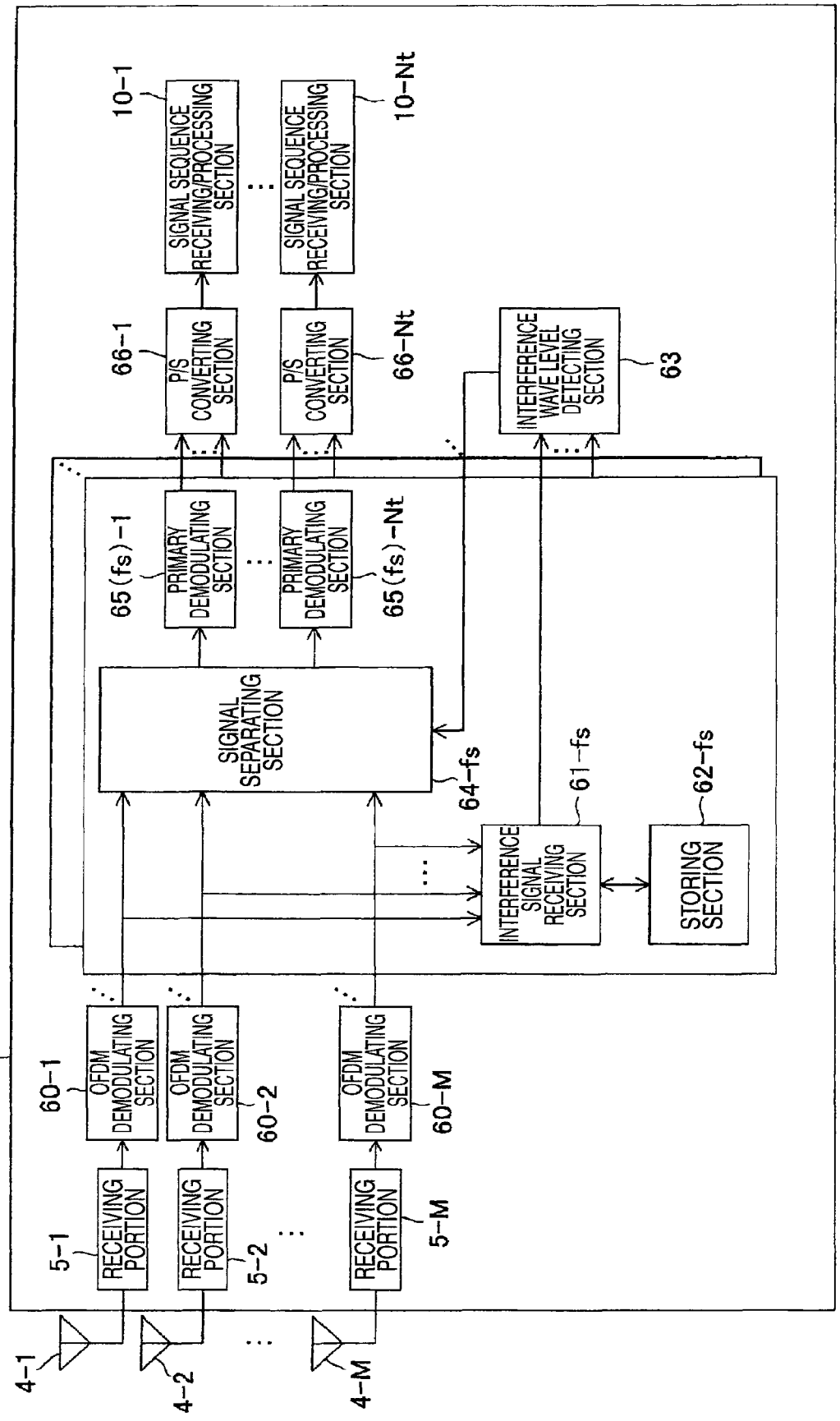
FIG. 9 A diagram showing a configuration of a radio communication device in a second embodiment of the present invention.

FIG. 9 is a diagram showing a configuration of a radio communication device 3a in a second embodiment of the present invention. In the first embodiment, the transmission system using a single is employed. In the second embodiment, an example in which the present invention is applied to the radio communication system using OFDM (Orthogonal Frequency Division Multiplexing) as a multi-carrier transmission is illustrated. Therefore, a radio communication device 3a is different partially in configuration from the first embodiment, and a processing system is provided every sub-carrier.

The radio communication device 3a of the second embodiment includes OFDM demodulating section 60-1 to 60-Nc, storing section 62-1 to 62-Nc, and signal separating section 64-1 to 64-Nc every sub-carrier. Also, an interference wave level detecting section 63 integrates output results of all interference signal receiving section 61-1 to 61-Nc, and decides whether or not the desired wave separating/receiving antenna weight in the signal separating section 64-1 to 64-Nc should be updated. In other words, a level of the interference wave component is sensed based on the received result of the interference signal in all sub-carriers of the OFDM, and the desired wave separating/receiving antenna weight is changed in response to the result of level sensing. Remaining configurations are similar to those in the first embodiment, and configurations and operations different from those in the first embodiment will be explained mainly in the following. Information of the OFDM modulating and demodulating method are disclosed in a literature (H. Ochi and K. Ueda, "OFDM System Technology and MATLAB Simulation Analysys", Triceps 2002), and their detailed explanation will be omitted herein.

In the second embodiment, like that of the first embodiment shown in FIG. 1, it is supposed that the radio communication device 3a receives the transmission signals from the desired radio communication device 1 and the interference source radio communication devices 2-1 to 2-S that employ the carrier frequency same as or similar to that of the desired radio communication device 1 to cause the interference. Here, only the receiving configuration of the radio communication device 3a is illustrated and illustration of the transmitting configuration is omitted herein.

In the radio communication device 3a, the operations executed until the outputs of the receiving portions 5-1 to 5-M are obtained based on the received signals of a plurality (M) of antennas 4-1 to 4-M are similar to those in the first embodiment. Each of OFDM demodulating section 60-1 to 60-M contains a GI (Guard Interval) removing section, an IFFT section, and a series-parallel converting section, not shown respectively, and executes the OFDM demodulation to output the symbol data sequence every Nc sub-carriers. Here, the symbol data sequence at a discrete time k every fs-th sub-carrier is represented as Y(k,fs). Where Y(k,fs) is the column vector containing the signals received by the M antennas as elements. That is, the signal $y_m$(k,fs) received by the antenna 4-m is used as the m-th element. Where fs=1 to Nc.

The operation using this signal will be explained with reference to FIG. 4 hereunder, like the first embodiment. First, it is sensed whether or not the transmission packet is contained in the frequency channel to be used (S21). If the transmission packet is contained, a frequency synchronization and a timing synchronization are established by using the already known training signal contained in the training signal portion, and the sender and destination address information of the transmission packet contained in the signaling portion subsequent to the training signal are read by equalizing a channel distortion, and also it is sensed whether or not the packet addressed to the own device is received (S22). Here, if the packet other than the packet addressed to the own device is received, the received signal is the interference wave and thus the process goes to a pre-process mode to learn the interference signal (S23). In contrast, if the packet addressed to the own device is received, the process goes to a receiving process mode to receive the transmission signal (S24).

In the pre-process mode (S23), the interference signal receiving section 61-$fs$ calculates an interference correlation matrix RI(fs) of the training signal portion every sub-carrier fs, and stores this matrix in the storing section 62-$fs$. Here, the interference correlation matrix $RI_n$(fs) denotes the interference correlation matrix when the n-th packet other than the packet addressed to the own device is received, and is calculated by using the channel distortion (referred to as a "channel estimate value" hereinafter) $h_n$(j,k,fs) calculated by using the training signal. Where $h_n$(j,k,fs) denotes the channel estimate value applied when the signal is transmitted by the k-th antenna 4-$k$ of the n-th interference source radio communication device 2-$n$ and is received by the j-th antenna 4-$j$ of the radio communication device 3. Also, fs=1, . . . , Nc, the n-th interference source radio communication device 2-$n$ has NIt (n) antennas, and NIt(n) is a natural number in excess of 1.

Here, in such a situation that a relative delay time from the preceding wave of the multipath on the channel is within the guard interval (GI) range, the frequency selective fading environment can be treated equivalently to the flat fading propagation environment in unit of sub-carrier with regard to the signals transmitted from the interference source radio communication devices 2-1 to 2-S. Therefore, if the flat fading channel is assumed, the interference correlation matrix $RI_n$ (fs) is calculated by following (Formula 19) when the n-th packet other than the packet addressed to the own device is received.

[Formula 19]

$$RI_n(f_s)=B(n,f_s)B^H(n,f_s)+P_nE_M \quad (19)$$

Where B(n,fs) is a M row and NIt(n) column matrix, and the element on the j-th row and the k-th column is $h_n$(j,k,fs). A superscript H denotes a vector adjoint operator. Also, $P_n$ denotes a noise power estimate value, and $E_M$ denotes a unit matrix of the M-th degree.

Here, as another calculating method of the interference correlation matrix RI(fs), there is the method of calculating the matrix not to use the channel estimate value calculated by using the training signal. In this case, following (Formula 20) is employed.

[Formula 20]

$$RI_n(f_s) = \frac{1}{Ns}\sum_{k=1}^{Ns} Y_n(t_0 + k \times dt, f_s)Y_n^H(t_0 + k \times dt, f_s) \quad (20)$$

Where $Y_n$(k,fs) is a column vector of the M-th degree, and the j-th element denotes a signal obtained by sampling the base band signal of the sub-carrier fs at a time t when the n-th packet other than the packet addressed to the own device is received by the j-th antenna 4-$j$ of the radio communication device 3$a$. Also, dt denotes a sampling time interval, to denotes a sampling start time, and Ns denotes the number of sampled data. In this case, since the interference correlation matrix RI can be calculated not to use the pilot signal, such matrix can be calculated by using the signal in the data portion. When the signal contained in the data portion is sufficiently long, the interference correlation matrix RI can be estimated with good accuracy.

The stored contents in the storing section 62-$fs$ are updated every sub-carrier by using the interference correlation matrix RIn(fs) obtained as above. As the updating approach, like the first embodiment, three approaches given as follows are employed solely or in combination.

1) To calculate the weighted mean interference correlation matrix.

2) To store the interference correlation matrix $RI_n$(fs) individually as it is. When the number of stored interference correlation matrixes exceeds a predetermined number NI, the interference correlation matrix is stored up to the predetermined number NI in order of the interference correlation matrix $RI_k$ having a higher received power. Where k is a natural number of NI or less.

3) To classify the matrix RI every sender address information and store the interference correlation matrix $RI_n$(fs) individually. When the interference correlation matrix of the same sender address is sensed in plural, they are stored after the weighted averaging process is done. Also, when the number of stored interference correlation matrixes exceeds the predetermined number NI, the interference correlation matrixes are preferentially up to the predetermined number NI while giving the preference to the sender address information of the interference correlation matrix $RI_k$(fs) having a higher received power. Where k is a natural number of NI or less.

Respective advantages of these three approaches are similar to those in the above-mentioned first embodiment.

Here, when the interference caused by the different type of communication system in such a way that the information in the signaling portion of the transmission packet cannot be read is present irrespective of the presence of the signal having an enough power level, the interference correlation matrix RI not using the channel estimate value derived by the training signal is calculated as given by above (Formula 20), then the storing section 62-$fs$ is updated.

The foregoing processes executed until the interference correlation matrix RI(fs) is stored when the packet other than the packet addressed to the own device is received correspond to the pre-process mode (S23).

Next, an explanation of the operation taken when the process goes to the receiving process mode (S24) will be made hereunder. Here, operations executed after the frequency synchronization, the phase synchronization, the symbol synchronization using the training signal in the training signal portion are established will be explained in the following. The received signals obtained via a plurality of antennas 4 and a plurality of receiving portions 5 in the radio communication device 3$a$ are output as the received signal vectors y(k). Here, k denotes a discrete time of the sampled signal.

In such a situation that a relative delay time from the preceding wave of the multipath on the channel is within the guard interval (GI) range, the frequency selective fading environment can be treated as the flat fading propagation environment in unit of sub-carrier with regard to the transmission sequence vectors X(k,fs)=$[X_1(k,fs), \ldots, X_{Nt}(k,fs)]^T$ (a superscript T is a vector transposed operator) consisting of transmission sequences $X_n$(k,fs) that are transmitted from respective Nt antennas of the desired radio communication device 1 every sub-carrier. Therefore, the received signal vectors Y(k, fs) of the sub-carrier fs in the radio communication device 3$a$ at a discrete time k are given by following (Formula 21).

[Formula 21]

$$Y(k,f_s)=H_1(k,f_s)X(k,f_s)+I(k,f_s)+n(k,f_s) \quad (21)$$

Where Y(k,fs) denote column vectors containing the received signals of the M antennas 4 used in reception as elements, and the signal $y_m$(k,fs) of the sub-carrier fs received by the antenna 4-m denotes the m-th element. Also, $H_1$ (fs) denotes the channel response matrix showing a channel variation that the transmission sequence X(k,fs) of the desired radio communication device 1 undergo. Here, $H_1$ (fs) denotes a matrix consisting of (the number M of antennas of the radio communication device 3a) rows (the number Nt of transmission antennas of the desired radio communication device 1) columns. A matrix element $h_{ij}$ at the i-th row and the j-th column denotes a channel variation caused when the signal $X_j$(k,fs) transmitted from the j-th transmission antenna of the desired radio communication device 1 is received by the i-th antenna 4-i of the radio communication device 3a.

Also, n(k,fs) denote noise component vectors of the sub-carrier fs attached when the transmission signals are received by the M antennas 4 of the radio communication device 3a. Also, I(k,fs) denote the interference signal components transmitted from one or plural the interference source radio communication devices 2-1 to 2-S. In this case, I(k,fs)=0 when no transmission signal from the interference source radio communication device 2 is present.

The received signal vectors Y(k,fs) of the radio communication device 3a are input into the interference signal receiving section 61-fs and the signal separating section 64-fs every corresponding sub-carrier. Where fs=1, . . . , Nc.

The interference signal receiving section 61-fs reads one or plural interference correlation matrixes $RI_n$(fs) obtained in the pre-process mode from the storing section 62-fs, and calculates the interference wave receiving antenna weight vectors $WI_n$(fs) that can receive the interference signal power I(k,fs) selectively by the spatial filtering. Then, the n-th interference wave component signal $Z_n$(k,fs) is extracted by executing a product-sum operation of the interference wave receiving antenna weight vector $WI_n$ fs) and the received signal vectors Y(k,fs), as given by following (Formula 22).
[Formula 22]

$$Z_n(k) = WI_n(f_s)^H Y(k, f_s) \tag{22}$$

Where n is a natural number of the number NI of interference correlation matrixes stored in the storing section 62-fs, and $Z_n$(k,fs) is formed of the column vector having elements in the number of spatial multiplexing streams that the interference source radio communication devices 2 transmit. Also, a superscript H denotes a vector adjoint operator.

At this time, the approach described as follow is applied to calculate the interference wave receiving antenna weight vector $WI_n$(fs) of the sub-carrier fs.

1) [Approach 5]: Following (Formula 23) is employed as the interference wave receiving antenna weight vector $WI_n$ (fs).
[Formula 23]

$$WI_n(f_s) = U_k^{(n)}(f_s) \tag{23}$$

Where $U_k^{(n)}$(fs) has eigenvectors corresponding to the eigenvalues, which are picked up in descending order of size up to the number of spatial multiplexing streams that the interference source radio communication devices 2 transmitted, out of M eigenvalues that are obtained by eigen decomposing the interference correlation matrix $RI_n$(fs) in terms of the eigenvalue as column vector components. Here, k=1, . . . , M. Accordingly, the interference wave can be received to maximize a power of the interference wave that has arrived at in producing the interference correlation matrix $RI_n$(fs).

Also, another approach described as follow is applied by changing the operation of the storing section 62-fs to calculate the interference wave receiving antenna weight vector $WI_n$(fs).

2) [Approach 6]: B(n,fs) obtained in the pre-process mode is stored in the storing section 62-fs in place of the interference correlation matrix $RI_n$(fs) obtained in the pre-process mode. In this case, following (Formula 24) is employed as the interference wave receiving antenna weight vector $WI_n$(fs).
[Formula 24]

$$WI_n(f_s) = D(f_s)_n^{-1} B(n, f_s) \tag{24}$$

Where $D_n$(fs) is calculated by following (Formula 25), $H_e$(fs) is an estimate value of a channel response matrix $H_1$(fs) that the transmission sequence x(k,fs) of the sub-carrier fs of the desired radio communication device 1 undergo, δ is a noise power estimate value, and $E_M$ is a square matrix of the M-th degree (where M is the number of receiving antenna branches in the radio communication device 3a). Accordingly, a power of the interference wave that has arrived at in producing the interference correlation matrix $RI_n$(fs) can be received selectively while suppressing the desired signal.
[Formula 25]

$$D_n(f_s) = H_e(f_s) H(f_s)_e^H + B(n, f_s) B^H(n, f_s) + \sigma E_M \tag{25}$$

In contrast, the signal separating section 64-fs for each sub-carrier fs separates/receives the receiving signal vector Y(k,fs) as the input by transforming the transmission sequence $x_n$(k,fs) transmitted from the desired radio communication device 1 into $WD_n(f_s)^H Y(k,fs)$ while using the desired wave separating/receiving antenna weight $WD_n$(fs). Here, n is a natural number of Nt or less, and Nt≧1. In other words, in the case of Nt=1, the signal separating section 64-fs executes the so-called diversity receiving operation and, in the case of Nt≧1, the signal separating section 64-fs executes the SDM receiving operation to separate/receive the transmission signal transmitted via the spatial multiplexing transmission. The desired wave separating/receiving operation made mainly by the signal separating section 64-fs and the interference wave level detecting section 63 will be explained with reference to FIG. 5 hereunder, like the first embodiment.

First, an initial desired wave separating/receiving antenna weight WD(fs) is calculated by following (Formula 26) (S50).
[Formula 26]

$$WD(f_s) = H_e(f_s) R_n(f_s)^{-1} \tag{26}$$

Here, WD(fs) consists of the matrix consisting of M rows and N columns, and the n-th column consists of $WD_n$. $R_n$(fs) is calculated by following (Formula 27). Also, $H_e$(fs) is an estimate value of a channel response matrix $H_1$(fs) that the transmission sequence x(k,fs) of the sub-carrier fs of the desired radio communication device 1 undergo, δ is a noise power estimate value, and $E_{Nt}$ is a square matrix of the Nt-th degree (where M is the number of receiving antenna branches in the radio communication device 3a). Now, the estimate value $H_e$(fs) of the channel response matrix $H_1$(fs) and the noise power estimate value δ are obtained from the already known signal sequence in the training signal portion of the packet signal addressed to the own device.
[Formula 27]

$$R_n(f_s) = H_e(f_s)^H H_e(f_s) + \sigma E_{Nt} \tag{27}$$

Here, the above approach is the signal separating approach based on the MMSE approach, but the above approach is not limited to this approach. Another approach such as ZF (Zero Forcing), MLD (Maximum Likelihood Detection), or the like may be applied.

Then, the interference wave level detecting section 63 detects the interference wave component power $P_n$ given by following (Formula 28), based on the output $Z_n(k,fs)$ of the interference signal receiving section 61-$fs$ every sub-carrier.
[Formula 28]

$$P_n \sum_{fs=1}^{Nc} \|Z_n(k, f_s)\|^2 \quad (28)$$

If the interference wave component powers $P_n$ detected for all sub-carriers exceed a predetermined value LI (S52:YES), the interference wave level detecting section 63 updates the desired wave separating/receiving antenna weight $WD_n(fs)$ in the signal separating section 64-$fs$ of each sub-carrier (S53). In contrast, if the interference wave component power $P_n$ does not exceed a predetermined value LI (S52:NO), the interference wave level detecting section 63 does not update the desired wave separating/receiving antenna weight $WD_n(fs)$ in the signal separating section 64-$fs$ and maintains the weight as it is (S52). In this case, as the case may be, the interference wave level detecting section 63 may detect not the interference wave component powers $P_n$ of all sub-carriers but the interference wave component power of a particular sub-carrier. Also, the interference wave level detecting section 63 may decide in response to the detected level whether or not the desired wave separating/receiving antenna weight should be updated.

When the interference wave level detecting section 63-$fs$ of each sub-carrier updates the desired wave separating/receiving antenna weight $WD_n(fs)$, it calculates a new desired wave separating/receiving antenna weight $WD_n(fs)$ given as follows and outputs the result to the signal separating section 64-$fs$.

1) [Approach 7]: When above (Formula 23) is employed as the interference wave receiving antenna weight vector $WI_n$(fs), the desired wave separating/receiving antenna weight $WD(fs)$ is updated based on following (Formula 29).
[Formula 29]

$$WD(f_s) = W_b(f_s)Q(f_s)_n^{-1} \quad (29)$$

Where $W_b$ are calculated by following (Formula 30), $v_k^{(n)}$ are eigenvectors (where $k=1, \ldots, Nt$) corresponding to the eigenvalues when Nt eigenvalues are picked up in ascending order of value from the M eigenvalues that are obtained by eigen decomposing the interference correlation matrix $RI_n$(fs) in terms of eigenvalue, and $Q_n$(fs) is given by following (Formula 31). Accordingly, the desired signal can be received selectively while suppressing the interference wave caused in producing the interference correlation matrix $RI_n$(fs). In this case, when a plurality of interference wave component powers ($P_{n0}$(fs), $P_{n1}$(fs), ...) that exceeds the predetermined value LI are present, the interference correlation matrix $RI_n$(fs) ($=a_0 RI_{n0}$(fs)$+a_1 RI_{n1}$(fs)$+$ ...) composed by adding the concerned interference correlation matrixes ($RI_{n0}$(fs), $RI_{n1}$(fs), ...) is employed (where $a_0, a_1, \ldots$ are the weighting factor).
[Formula 30]

$$W_b(f_s) = [v_1^{(n)} \ldots v_{Nt}^{(n)}] \quad (30)$$

[Formula 31]

$$Q_n(f_s) = [W_b(f_s)H_e(f_s)]^H W_b(f_s)H_e(f_s) + \sigma E_{Nt} \quad (31)$$

2) [Approach 8]: $B(n,fs)$ obtained in the pre-process mode is stored in the storing section 62-$fs$ instead of the interference correlation matrix $RI_n$(fs) obtained in the pre-process mode. Also, when above (Formula 24) is employed as the interference wave receiving antenna weight vector $WI_n$(fs), the desired wave separating/receiving antenna weight $WD(fs)$ is updated based on following (Formula 32).
[Formula 32]

$$WD(f_s) = W_b(f_s)Q_n(f_s)^{-1} \quad (32)$$

Where $W_b$(fs) are calculated by following (Formula 33), $F_n$(fs) are calculated by following (Formula 34), and $Q_n$(fs) are calculated by following (Formula 35). Here, a constant a in (Formula 34) is a parameter used to vary the interference suppressing effect, and the space filtering operation puts a higher priority on an inference suppression rather than an increase of the desired wave received power as the constant a is increased. Accordingly, the desired signal can be received while suppressing the interference wave caused by producing the interference correlation matrix $RI_n$(fs). In this case, when a plurality of interference wave component powers ($P_{n0}$(fs), $P_{n1}$(fs), ...) that exceeds the predetermined value LI are present, the correlation matrix $B(n,fs))B^H(n,fs))(=a_0 B(n_0)B^H(n_0,fs)+a_1 B(n_1,fs)B^H(n_1,fs)+ \ldots)$ composed by adding the correlation matrixes generated from the concerned interference channel response matrixes ($B(n_0,fs), B(n_1,fs), \ldots$) is employed (where $a_0, a_1, \ldots$ are the weighting factor).
[Formula 33]

$$W_b(f_s) = F_n(f_s)^{-1} H_e(f_s) \quad (33)$$

[Formula 34]

$$F_n(f_s) = (1-a)H_e(f_s)H_e(f_s)^H + aB(n,f_s)B^H(n,f) + \sigma E_M \quad (34)$$

[Formula 35]

$$Q_n(f_s) = [W_b(f_s)H_e(f_s)]^H W_b(f_s)H_e(f_s) + \sigma W_b(f_s)^H W_b(f_s) \quad (35)$$

Then, primary demodulating section 65($fs$)-1 to 65($fs$)-Nt convert the output signal, which consists of Nt symbol data sequence obtained by the signal separating section 64-$fs$ every sub-carrier fs, to the bit data sequence based on the mapping information used in the modulation.

Then, P/S converting section 66-1 to 66-Nt convert the sub-carrier bit data of sub-carriers fs=1 to Nc obtained in parallel into the series bit data sequence. That is, the m-th P/S converting section 66-$m$ converts the bit data sequence obtained in parallel by the primary demodulating section 65($fs$)-$m$ for all sub-carriers fs=1 to Nc into the series bit data sequence.

Then, the signal sequence receiving/processing section 10-1 to 10-Nt execute the receiving process for restoring the transmission bit sequence, by applying the de-interleaving process for restoring the bit order by the opposite operation to the interleaving process applied on the transmission side, the error correcting/decoding process, and the like to the bit data sequence output from the P/S converting section 66-1 to 66-Nt.

According to the above operations, like the first embodiment, in the communication system using the multicarrier transmission in the present invention, when a variation of the interference wave component is detected or the interference source radio communication device 2 for causing the interference appears or a variation of the interference wave component changes, the desired wave separating/receiving antenna weight used to reduce the interference by using the new interference correlation matrix can be changed adaptively. As a result, the spatial filtering adaptable to the interference wave that appears unsteadily can be implemented, and stabilization of the communication quality can be achieved by enhancing the interference canceling ability. For example, even though the co-channel interference is caused unsteadily by the different interference wave sources, the stable receiving quality can be obtained.

Also, as another calculating method of the interference correlation matrix $RI_n(fs)$ every sub-carrier, A) when a timing at which no signal is received is contained in the training signal in receiving the packet addressed to the own device, the interference correlation matrix may be calculated at this non-signal timing by using above (Formula 20). Accordingly, the interference correlation matrix of the interference source that causes the co-channel interference can be sensed with good accuracy in receiving the packet addressed to the own device.

Also, as still another calculating method of the interference correlation matrix $RI_n(fs)$, B) the correlation matrix obtained by using above (Formula 20) may be employed in the data portion in receiving the packet addressed to the own device. In this case, the correlation matrix is divided into a plurality of blocks in the data portion by shifting a calculating timing and a calculating range, and these blocks are employed as the interference correlation matrix $RI_n(fs)$. Accordingly, the interference correlation matrix of the interference source that causes the co-channel interference can be calculated while shifting a time in receiving the packet addressed to the own device, and as a result a tracking performance can be increased when the interference wave source varied in time.

Third Embodiment

Figure 10:
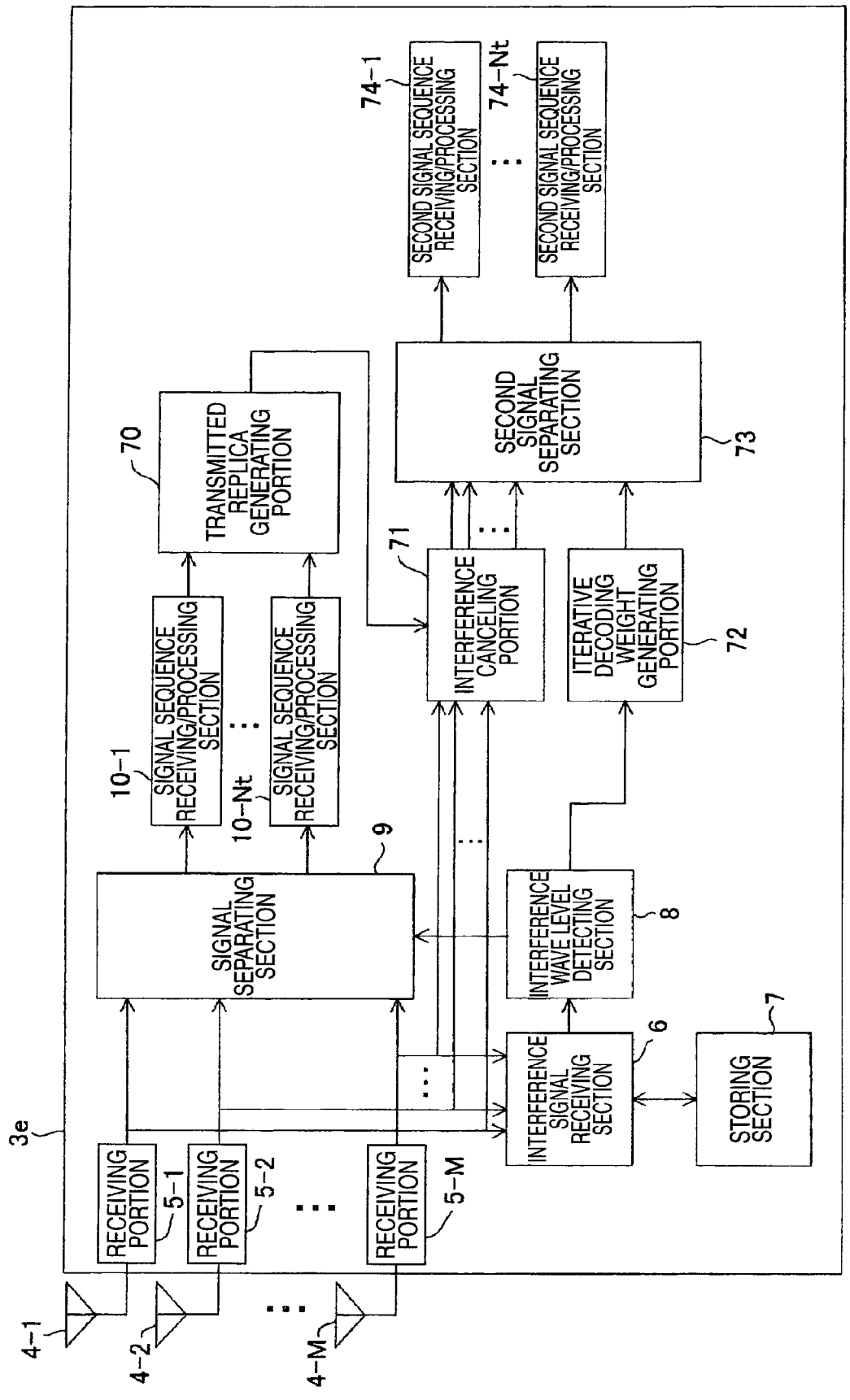
FIG. 10 A diagram showing a configuration of a radio communication device in a third embodiment of the present invention.

FIG. 10 is a diagram showing a configuration of a radio communication device 3e in a third embodiment of the present invention. The radio communication device 3e of the third embodiment is constructed by adding a transmitted replica generating portion 70 for generating a transmitted replica by executing a re-coding and a re-modulation based on the result decoded by the signal sequence receiving/processing section 10, an interference canceling portion 71 for executing a canceling process of signals except the desired signal by using the generated transmitted replica and the channel estimate value, an iterative decoding weight generating portion 72 for generating an iterative decoding weight used to remove interference components of other stations detected by the interference wave level detecting section 8, a second signal separating section 73 for extracting a desired signal component from which the interference components of other stations are removed, by applying a product-sum operation to the output of the interference canceling portion 71 using the iterative decoding weight, and second signal sequence receiving/processing section 74 for applying the receiving process to an output of the second signal separating section 73, to the configuration in FIG. 1 explained in the first embodiment.

The configurations and the operations different from those in FIG. 1 will be explained mainly with reference to FIG. 10 hereunder. Here, like the first embodiment, it is supposed that the transmission signals are sent out from the desired radio communication device 1 and the interference source radio communication devices 2-1 to 2-S and these transmission signals are received by the radio communication device 3e. The desired radio communication device 1, the interference source radio communication devices 2-1 to 2-S, and the radio communication device 3e are equipped with a plurality of antennas respectively such that the SDM transmission can be made. Also, it is supposed that the radio communication device 3e receives the transmission signals from the desired radio communication device 1 as the desired transmission signal source and the interference source radio communication devices 2-1 to 2-S as the interference source to cause the interference because these devices use the same or similar carrier frequency as or to that of the desired radio communication device 1. Here, only a receiving configuration of the radio communication device 3e is illustrated herein, and illustration of a transmitting configuration is omitted herein.

Now, the operations in the pre-process mode at a time of non-active communication are similar to those in the first embodiment. That is, like the first embodiment, as the operations in the pre-process mode in the non-active communication mode, the signals are received previously from a plurality of interference source radio communication devices 2 to get the interference correlation matrix RI, and then the interference wave receiving antenna weight WI used to receive selectively the transmission signals from the interference source radio communication devices 2 are prepared based on the resultant interference correlation matrix RI.

Also, the operations taken until the desired signal is received in the receiving process mode at a time of communication are similar to those in the first embodiment. That is, like the first embodiment, as the process in the receiving process mode at a time of communication, the transmission signals are normally received, and a variation of the interference wave component is detected based on the signal power received using the interference wave receiving antenna weight WI. Then, when the interference source radio communication device 2 for causing the interference appears or a variation of the interference wave component changes, the desired wave separating/receiving antenna weight WD used to reduce the interference by using the new interference correlation matrix can be changed adaptively, so that the desired signal can be received by the signal sequence receiving/processing section 10 via the signal separating section 9.

The signal sequence receiving/processing sections 10-1 to 10-Nt execute the receiving process for restoring the transmission bit sequence, by applying the demapping process for converting the symbol data sequence based on a predetermined modulation system to the bit data sequence, the de-interleaving process for restoring the bit order by an opposite operation to the interleaving process applied on the transmission side, the error correcting/decoding process for correcting the error in the input bit data sequence, and the like to the Nt output signals from the signal separating section 9 corresponding to the Nt (where Nt>1) transmission sequence transmitted from the desired radio communication device 1. In the first embodiment, the outputs obtained by the signal sequence receiving/processing sections 10-1 to 10-Nt are used as the final output. However, in the third embodiment, an iterative decoding process is executed by using the outputs obtained by the signal sequence receiving/processing sections 10-1 to 10-Nt as a tentative decision bit sequence $b_m(k)$. Where $m=1, \ldots, Nt$. Then, the operation different from the first embodiment will be explained hereunder.

The transmitted replica generating portion 70 re-generates a tentative decision transmission symbol sequence $x^{[1]}_m(k)$ based on the tentative decision bit sequence $b_m(k)$. Where $m=1, \ldots, Nt$. More particularly, the transmitted replica generating portion 70 contains a channel coding portion, a puncture processing portion, an interleaver, and a symbol mapping portion (all not shown), and executes operations explained as follows by using respective portions. The channel coding portion applies the error correcting code in the same system as that applied at a time of transmission, based on the tentative decision bit sequence $b_m(k)$. The puncture processing portion applies a puncture process to set the output bit sequence being subjected to the error correcting coding process at the same coding ratio as that applied at a time of transmission. The interleaver applies the same interleave process as that applied at a time of transmission to the output bit sequence being subjected to the puncture process. The symbol mapping portion applies a symbol mapping process to the output bit sequence being subjected to the interleave process by using a modulation system containing a predetermined number of levels of the multilevel modulation.

The interference canceling portion 71 generates replica signals $y^{[1]}k$ of the received signal vector y(k) given by following (Formula 36), by using the tentative decision transmission symbol sequence $x^{[1]}_m(k)$ as the output of the transmitted replica generating portion 70 and the channel estimate value $H_e$ of the channel response matrix $H_1$ that is applied to the transmission sequence x(k) of the desired radio communication device 1. Where $x^{[1]}(k)$ is the column vector of the Nt-th degree, and the m-th element consists of the tentative decision transmission symbol sequence $x^{[1]}_m(k)$.
[Formula 36]

$$y^{[1]}(k)=H_e x^{[1]}(k) \qquad (36)$$

The interference canceling portion 71 considers the spatial multiplexing stream except the desired r-th spatial multiplexing stream as the interference signal, removes the interference signal from the received signal vector y(k) as the output of the receiving portions 5, and outputs the r-th spatial multiplexing stream being removed as the interference. That is, the interference canceling portion 71 calculates an interference cancel output $u_r(k)$, as given by following (Formula 37).
[Formula 37]

$$u_r(k)=y(k)-H_e G_r x^{[1]}(k) \qquad (37)$$

Where Gr denotes the matrix in which the r-th row and r-th column diagonal element is set to 0 in the Nt-degree unit matrix. Also, r is a natural number from 1 to Nt, and $x^{[1]}(k)$ is a replica signal. Also, the interference cancel output $u_r(k)$ is the column vector having M elements. The above interference canceling operation is applied to all M spatial multiplexing streams that have been transmitted. That is, the interference canceling operation given by above (Formula 37) is executed at r=1, . . . , Nt.

The iterative decoding weight generating portion 72 executes the operation for updating an iterative decoding antenna weight $WD_2(r)$ for the r-th desired wave signal given by following (Approach 9) or (Approach 10), together with the operation for updating the desired wave separating/receiving antenna weight WD based on the output of the interference wave level detecting section 8, and then outputs the result to the second signal separating section 73. In this case, when no interference wave is detected by the interference wave level detecting section 8, the iterative decoding weight generating portion 72 generates the maximal ratio combining weight for the interference cancel output $u_r(k)$. In the following, Dr denotes the matrix in which all elements except the r-th row and r-th column diagonal element are set to 0 in the Nt-degree unit matrix. Where r is a natural number of Nt or less.

1) [Approach 9] the case where above (Formula 5) is employed as the interference wave receiving antenna weight vector $WI_n$:

The iterative decoding antenna weight $WD_2(r)$ is updated based on following (Formula 38).
[Formula 38]

$$WD_2(r)=(v_{min}^{(n)H} H_e D_r)^{-1} v_{min}^{(n)} \qquad (38)$$

Where $v_{min}^{(n)}$ denotes an eigenvector corresponding to a minimal eigenvalue out of M eigenvalues that are obtained by eigen decomposing the interference correlation matrix $RI_n$ detected by the interference wave level detecting section 8 in terms of the eigenvalue. The iterative decoding antenna weight $WD_2(r)$ gives the antenna weight that maximizes a power of the desired wave while minimizing the interference wave. Accordingly, not only the interference wave caused in generating the interference correlation matrix $RI_n$ can be suppressed but also the desired signal can be received selectively.

2) [Approach 10] the case where B(n) obtained in the pre-process mode is stored in the storing section 7 in place of the interference correlation matrix $RI_n$ obtained in the pre-process mode, and above (Formula 6) is employed as the interference wave receiving antenna weight vector $WI_n$:

The iterative decoding antenna weight $WD_2(r)$ is updated based on following (Formula 39).
[Formula 39]

$$WD_2(r)=W_b(r)Q_n(r)^{-1} \qquad (39)$$

Where $W_b$ are calculated by following (Formula 40), $F_n$ are calculated by following (Formula 41), and $Q_n$ are calculated by following (Formula 42). Here, a constant a in (Formula 41) is a parameter used to vary the interference suppressing effect, and the space filtering operation puts a higher priority on an inference suppression rather than an increase of the desired wave received power as the constant a is increased. The iterative decoding antenna weight $WD_2(r)$ gives the antenna weight that maximizes a power of the desired wave and also suppresses the corresponding interference wave below a predetermined level. Accordingly, the desired signal can be received while suppressing the interference wave caused by generating the interference correlation matrix $RI_n$.
[Formula 40]

$$W_b(r)=F_n(r)^{-1} H_e D_r \qquad (40)$$

[Formula 41]

$$F_n(r)=(1-a)H_e D_r (H_e D_r)^H + aB(n)B^H(n) + \sigma E_M \qquad (41)$$

[Formula 42]

$$Q_n(r)=(W_b^H H_e D_r)^H W_b^H H_e D_r + \sigma W_b^H W_b \qquad (42)$$

The second signal separating section 73 multiplies the output vector $u_r(k)$ of the r-th interference canceling portion by the iterative decoding antenna weight $WD_2(r)$ as the output of the iterative decoding weight generating portion 72 to get a product-sum operation $Ar(k)=WD_2(r)^H u_r(k)$. Accordingly, the signal in which an interference wave signal component contained in the output vector $u_r(k)$ of the r-th interference canceling portion is suppressed can be obtained. Where r is a natural number of Nt or less.

Then, the Nt second signal sequence receiving/processing sections 74-1 to 74-Nt receive the Nt output signals Ar(k) from the second signal separating section 73 as the inputs respectively, and then execute the receiving process for restoring the transmission bit sequence, by applying the demapping process for converting the symbol data sequence based on the predetermined modulation system to the bit data sequence, the de-interleaving process for restoring the bit order by the opposite operation to the interleaving process applied on the transmission side, the error correcting/decoding process for correcting the error in the input bit data sequence, and the like. Where r is a natural number of Nt or less.

According to the above operations, in the third embodiment, in addition to the advantages of the first embodiment, the receiving diversity effect can be increased by making further the receiving process based on the iterative decoding process, and also a receiving quality can be improved. More particularly, at a time of non-active communication, the signals are received in advance from a plurality of interference source radio communication devices 2 as the pre-process mode to get the interference correlation matrix RI, and then the interference wave receiving antenna weight WI used to receive selectively the transmission signals from the interference source radio communication devices 2 are prepared based on the resultant interference correlation matrix RI. At a time of communication, the operation goes to the receiving process mode to normally receive the signal, and a variation of the interference wave component is detected based on the signal power received using the interference wave receiving antenna weight WI. Then, when the interference source radio communication device 2 for causing the interference appears or a variation of the interference wave component changes, the iterative decoding antenna weight $WD_2(r)$ used to reduce the interference by using the new interference correlation matrix can be changed adaptively.

Accordingly, the spatial filtering adaptable for the interference wave that appears unsteadily can be introduced into the iterative decoding process. As a result, the interference suppressing effect and the receiving diversity effect for the desired wave reception can be increased and thus stabilization of a communication quality can be further achieved. For example, even though the co-channel interference or the adjacent channel interference is caused unsteadily from different interference wave sources, the stabilized receiving quality can be obtained.

In the above third variation of the first embodiment, like the sub-array weight multiplying portions 92-1 to 92-3 shown in FIG. 8, the weight for suppressing the interference wave received power is generated in a k sub-array set (k is smaller than M) out of M antennas. In this case, the second signal separating section 73 in the third embodiment may be divided into a sub-array set and the weight for suppressing the interference wave received power is generated in such set. The number of degree of the matrix in generating the antenna weight can be lowered by using the sub-array configuration, and such an advantage can be obtained that computational complexity in the inverse matrix operation and the eigen decomposition operation can be reduced largely.

Fourth Embodiment

Figure 11:
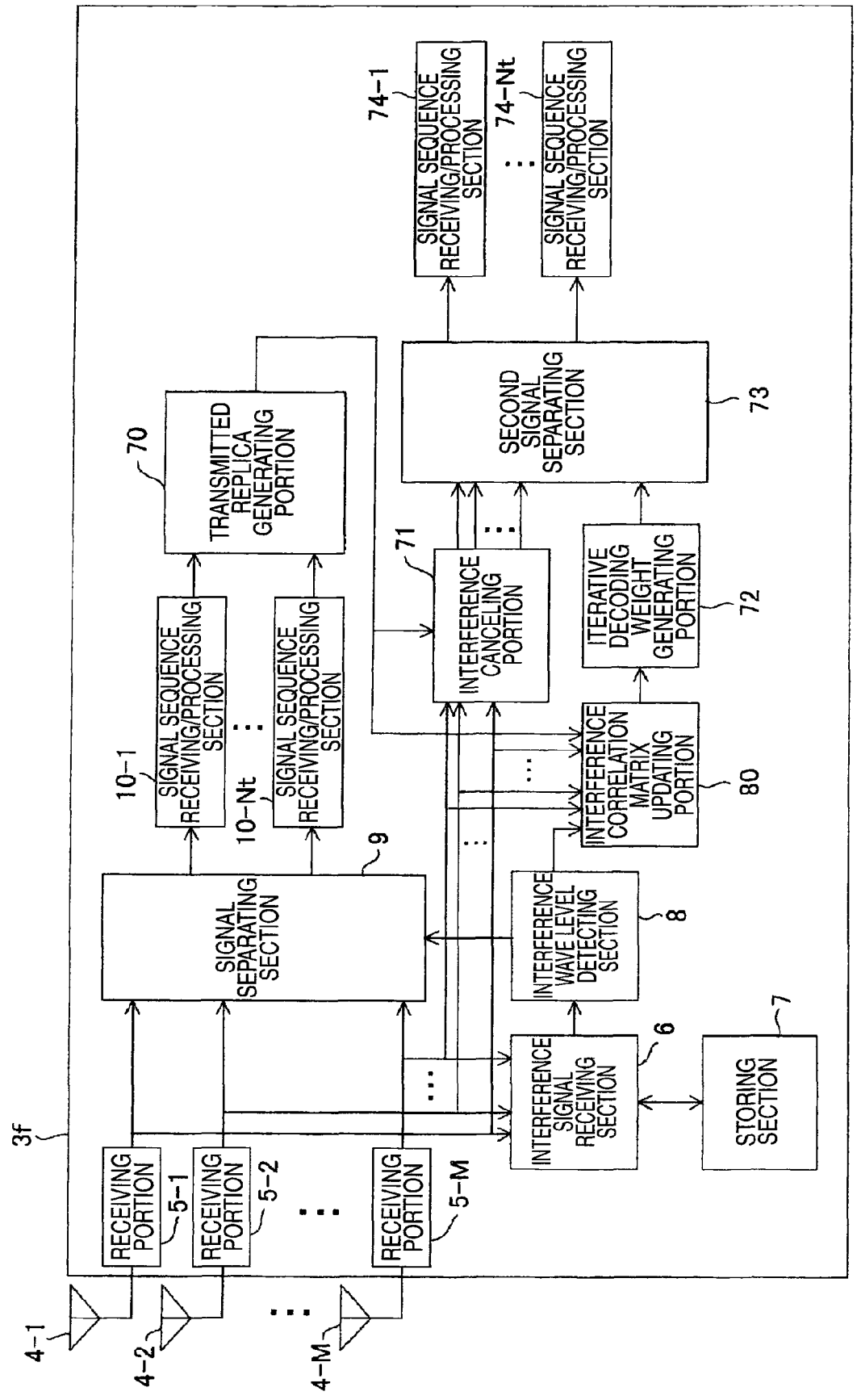
FIG. 11 A diagram showing a configuration of a radio communication device in a fourth embodiment of the present invention.

FIG. 11 is a diagram showing a configuration of a radio communication device 3f in a fourth embodiment of the present invention. The radio communication device 3f is constructed by further adding an interference correlation matrix updating portion 80 for updating the interference correlation matrix of the interference components of other stations detected by the interference wave level detecting section 8, to the configuration in FIG. 10 explained in the third embodiment.

The configuration and the operation different from those in FIG. 10 will be explained with reference to FIG. 11 hereunder. Here, like the first embodiment, it is supposed that the transmission signals are sent out from the desired radio communication device 1 and the interference source radio communication devices 2-1 to 2-S and these transmission signals are received by the radio communication device 3f. The desired radio communication device 1, the interference source radio communication devices 2-1 to 2-S, and the radio communication device 3f are equipped with a plurality of antennas respectively such that the SDM transmission can be made. Also, it is supposed that the radio communication device 3f receives the transmission signals from the desired radio communication device 1 as the desired transmission signal source and the interference source radio communication devices 2-1 to 2-S as the interference source to cause the interference because these devices use the same or similar carrier frequency as or to that of the desired radio communication device 1. Here, only a receiving configuration of the radio communication device 3f is illustrated herein, and illustration of a transmitting configuration is omitted herein.

Now, the operations in the pre-process mode at a time of non-active communication are similar to those in the first embodiment. That is, like the first embodiment, as the operations in the pre-process mode in the non-active communication mode, the signals are received previously from a plurality of interference source radio communication devices 2 to get the interference correlation matrix RI, and then the interference wave receiving antenna weight WI used to receive selectively the transmission signals from the interference source radio communication devices 2 are prepared based on the resultant interference correlation matrix RI.

Also, the operations taken until the desired signal is received in the receiving process mode at a time of communication are similar to those in the first embodiment. That is, like the first embodiment, as the process in the receiving process mode at a time of communication, the transmission signals are normally received, and a variation of the interference wave component is detected based on the signal power received using the interference wave receiving antenna weight WI. Then, when the interference source radio communication device 2 for causing the interference appears or a variation of the interference wave component changes, the desired wave separating/receiving antenna weight WD used to reduce the interference by using the new interference correlation matrix can be changed adaptively, so that the desired signal can be received by the signal sequence receiving/processing section 10 via the signal separating section 9.

Also, like the third embodiment, the tentative decision bit sequence $b_m(k)$ is generated in the signal sequence receiving/processing sections 10-1 to 10-Nt, and the tentative decision transmission symbol sequence $x^{[1]}_m(k)$ is re-generated based on the tentative decision bit sequence $b_m(k)$ in the transmitted replica generating portion 70. Where m=1, . . . , Nt.

Then, like the third embodiment, the interference canceling portion 71 generates the replica signal $y^{[1]}(k)$ of the receiving signal vector y(k), as given by (Formula 36), by using the tentative decision transmission symbol sequence $x^{[1]}_m(k)$ as the output of the transmitted replica generating portion 70 and the channel estimate value $H_e$ of the channel response matrix $H_1$ that the transmission sequence x(k) of the desired radio communication device 1 undergo. Also, the interference canceling portion 71 considers the spatial multiplexing streams except the desired r-th spatial multiplexing stream as the interference signal, removes such spatial multiplexing streams from the receiving signal vector y(k) as the output of the receiving portion 5, and outputs the r-th spatial multiplexing stream being removed as the interference signal. That is, the interference canceling portion 71 calculates an interference cancel output $u_r(k)$ as given by (Formula 37). Next, the operations different from those in the third embodiment will be explained hereunder.

The interference correlation matrix updating portion 80 executes the operation for updating the interference correlation matrix $RI_n$ or $B(n)B(n)^H$ as follows, together with the operation for updating the desired wave separating/receiving antenna weight WD based on the output of the interference wave level detecting section 8, and then outputs the result to the iterative decoding weight generating portion 72. In this case, when no interference wave is detected by the interference wave level detecting section 8, the interference correlation matrix updating portion 80 does not executes the updating operation.

The interference correlation matrix updating portion 80 generates the replica signals $y^{[1]}k$ of the received signal vector y(k) given by following (Formula 43), by using the tentative decision transmission symbol sequence $x^{[1]}_m(k)$ as the output of the transmitted replica generating portion 70 and the channel estimate value $H_e$ of the channel response matrix $H_1$ that the transmission sequence x(k) of the desired radio communication device 1 receives. Also, the interference correlation matrix updating portion 80 outputs a desired signal removing signal in which all spatial multiplexing streams are removed from the receiving signal vector y(k) as the output of the receiving portion 5. That is, the interference correlation matrix updating portion 80 calculates a desired signal removing vector $u_a(k)$ given by (Formula 43). Where $x^{[1]}(k)$ is the column vector of the Nt-th degree, and the m-th element consists of the tentative decision transmission symbol sequence $x^{[1]}_m(k)$.

[Formula 43]

$$u_a(k) = y(k) - y^{[1]}(k) \quad (43)$$

Then, the interference correlation matrix updating portion 80 calculates the interference correlation matrix given by following (Formula 44) or (Formula 45) by using the desired signal removing vector $u_a(k)$ in the sample number Nw corresponding to a period during which the same desired wave separating/receiving antenna weight WD is employed, together with the operation for updating the desired wave separating/receiving antenna weight WD based on the output of the interference wave level detecting section 8.

[Formula 44]

$$RI_n = \frac{1}{Nw} \sum_{k=1}^{Nw} u_a(k) u_a^H(k_s) \quad (44)$$

[Formula 45]

$$B(n)B(n)^H = \frac{1}{Nw} \sum_{k=1}^{Nw} u_n(k) u_n^H(k_s) \quad (45)$$

The iterative decoding weight generating portion 72 executes the operation for updating the iterative decoding antenna weight $WD_2(r)$ for the r-th desired wave signal by using the updated interference correlation matrix as the output of the interference correlation matrix updating portion 80, and outputs the result to the second signal separating section 73. Here, calculation of the iterative decoding antenna weight $WD_2(r)$ is similar to the third embodiment. In this case, when no interference wave is detected by the interference wave level detecting section 8, the iterative decoding weight generating portion 72 generates the maximal ratio combining weight that maximizes the received power of the desired wave signal for the interference cancel output $u_r(k)$.

According to the above operations, in the fourth embodiment, because the interference correlation matrix updating portion 80 is provided, the interference correlation matrix can be re-estimated by using the receiving signal and the transmitted replica signal obtained by the iterative decoding process. Accordingly, even when the interference wave component contains a time-dependent variation in contrast to the non-active communication mode, a new interference correlation matrix responding to the time-dependent variation can be calculated by executing the re-estimation. Therefore, the iterative decoding antenna weight $WD_2(r)$ used to reduce the interference can be changed adaptively by using this matrix.

In this manner, according to the fourth embodiment, the interference suppressing effect and the receiving diversity effect for the desired wave reception can be increased and thus stabilization of a communication quality can be further achieved in addition to the advantages in the third embodiment. For example, even though the co-channel interference or the adjacent channel interference is caused unsteadily from different interference wave sources, the stabilized receiving quality can be obtained.

In the fourth embodiment, the configuration applied to the case where the spatial multiplexing number Nt is larger than 1 is shown. But the present invention can be applied similarly to the case where the spatial multiplexing number Nt=1, i.e., the case where no spatial multiplexing transmission is carried out.

Figure 12:
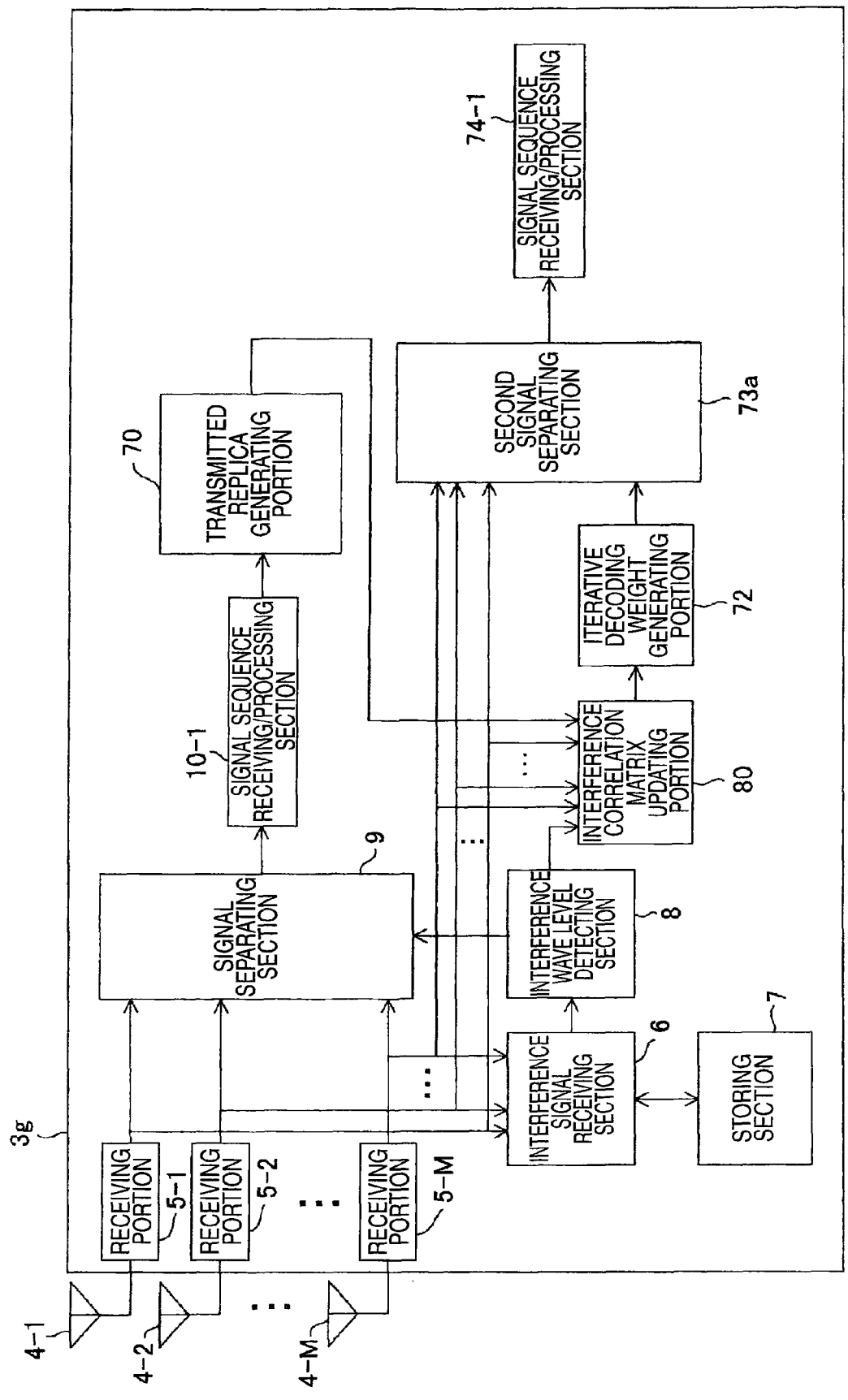
FIG. 12 A block diagram showing a configuration of a variation of the radio communication device in the fourth embodiment.

FIG. 12 is a block diagram showing a configuration of a variation of the radio communication device when no spatial multiplexing transmission is carried out. An explanation of an operation of this variation will be made with reference to FIG. 12 hereunder. In FIG. 12, a difference from the configuration in FIG. 11 is that the interference canceling portion 71 is not contained and an operation of a second signal separating section 73a is partially different. Only the operation of the second signal separating section 73a in a radio communication device 3g in FIG. 12 will be explained hereunder.

The second signal separating section 73a multiplies the receiving signal vector y(k) by the iterative decoding antenna weight $WD_2(r)$ as the output of the iterative decoding weight generating portion 72 to get a product-sum operation $A_1(k) = WD_2(r)^H y(k)$. Accordingly, the desired wave signal in which the interference wave signal component contained in the receiving signal vector y(k) is suppressed can be obtained. With the above operation, even in the case where the spatial multiplexing number Nt=1, i.e., the case where no spatial multiplexing transmission is carried out, the advantages similar to the fourth embodiment can be achieved.

The present invention is explained in detail with reference to the particular embodiments. But it is apparent for those skilled in the art that various variations and modifications can be applied without departing from a spirit and a scope of the present invention.

This application is based upon Japanese Patent Application (Patent Application No. 2005-292504) filed on Oct. 5, 2005 and Japanese Patent Application (Patent Application No. 2006-269287) filed on Sep. 29, 2006; the contents of which are incorporated herein by reference.

INDUSTRIAL APPLICABILITY

The present invention possesses such an advantage that the spatial filtering adaptable for the interference wave that appears unsteadily even in a condition that the interference wave does not steadily exist can be implemented and thus the interference canceling ability can be increased, and is used as the terminal of the radio communication system having such a multicell configuration that a plurality of terminals share the same channel with each other, or the like, for example, and is useful to the radio communication device capable of receiving the desired signal by suppressing the interference component from the interference wave source, and the like.

The invention claimed is:

1. A radio communication device, comprising:
an interference signal receiving section which receives an interference signal containing an interference wave component by using an interference wave receiving antenna weight for receiving selectively a signal of the interference wave component;

an interference wave level detecting section which detects a signal level of the interference wave component from an output of the interference signal receiving section; and a signal separating section which changes a desired wave separating/receiving antenna weight used to receive a desired signal, based on the output of the interference signal receiving section, wherein the signal separating section includes:
 a first weight multiplying portion for multiplying a weight to remove preferentially an interference signal from other station, and
 a second weight multiplying portion for multiplying an output of the first weight multiplying portion by a space multiplexing separating weight to separate a space multiplexing stream.

2. The radio communication device according to claim 1, wherein the desired wave separating/receiving antenna weight is a weight that minimizes an interference wave received power.

3. The radio communication device according to claim 1, wherein the desired wave separating/receiving antenna weight is a weight that maximizes a signal to interference power ratio.

4. The radio communication device according to claim 1, wherein the desired wave separating/receiving antenna weight is a weight that minimizes an interference wave received power for k sub-arrays (k is smaller than N) out of N antennas.

5. The radio communication device according to claim 1, further comprising:
 a channel estimating portion which executes a channel estimation by using an output of the first weight multiplying portion,
 wherein the signal separating section generates a weight used in the second weight multiplying portion based on an output of the channel estimating portion.

6. The radio communication device according to claim 1, wherein, when an output of the interference wave level detecting section exceeds a predetermined value, the signal separating section receives a desired signal and changes the desired wave separating/receiving antenna weight to suppress the detected interference wave.

7. The radio communication device according to claim 1, wherein the interference wave level detecting section detects a signal level of interference wave components from a plurality of interference sources.

8. The radio communication device according to claim 1, wherein the interference wave receiving antenna weight is a weight that maximizes an interference wave power with respect to a desired signal power.

9. The radio communication device according to claim 1, wherein the interference wave receiving antenna weight is a weight that maximizes a received power of a communication signal between the radio communication devices except a concerned radio communication device.

10. A radio communication device, comprising:
 an interference signal receiving section which receives an interference signal containing an interference wave component by using an interference wave receiving antenna weight for receiving selectively a signal of the interference wave component;
 an interference wave level detecting section which detects a signal level of the interference wave component from an output of the interference signal receiving section; and
 a signal separating section which changes a desired wave separating/receiving antenna weight used to receive a desired signal, based on the output of the interference signal receiving section, wherein the signal separating section includes:
  a first weight multiplying portion for multiplying a weight to remove preferentially an interference signal from other station, and
  a second weight multiplying portion for multiplying an output of the first weight multiplying portion by a maximal ratio combining weight to maximize a signal power.

11. The radio communication device according to claim 10, further comprising:
 a channel estimating portion which executes a channel estimation by using an output of the first weight multiplying portion,
 wherein the signal separating section generates a weight used in the second weight multiplying portion based on an output of the channel estimating portion.

12. A radio communication device, comprising:
 an interference signal receiving section which receives an interference signal containing an interference wave component by using an interference wave receiving antenna weight for receiving selectively a signal of the interference wave component;
 an interference wave level detecting section which detects a signal level of the interference wave component from an output of the interference signal receiving section; and
 a signal separating section which changes a desired wave separating/receiving antenna weight used to receive a desired signal, based on the output of the interference signal receiving section,
 wherein the interference wave level detecting section detects a signal level of interference wave components from a plurality of interference sources, and
 wherein, when the signal level of the interference wave components from the plurality of interference sources in an output of the interference wave level detecting section exceeds a predetermined value, the signal separating section receives the desired signal and changes the desired wave separating/receiving antenna weight in response to the signal level of the interference wave components to suppress a plurality of detected interference waves.

13. A radio communication device, comprising:
 an interference signal receiving section which receives an interference signal containing an interference wave component by using an interference wave receiving antenna weight for receiving selectively a signal of the interference wave component;
 an interference wave level detecting section which detects a signal level of the interference wave component from an output of the interference signal receiving section; and
 a signal separating section which changes a desired wave separating/receiving antenna weight used to receive a desired signal, based on the output of the interference signal receiving section,
 wherein the interference signal receiving section calculates the interference wave receiving antenna weight that maximizes an interference wave power, by using a correlation matrix that is obtained from a receiving signal in a time interval in which no desired signal is contained.

14. A radio communication device, comprising:
an interference signal receiving section which receives an interference signal containing an interference wave component by using an interference wave receiving antenna weight for receiving selectively a signal of the interference wave component;
an interference wave level detecting section which detects a signal level of the interference wave component from an output of the interference signal receiving section; and
a signal separating section which changes a desired wave separating/receiving antenna weight used to receive a desired signal, based on the output of the interference signal receiving section,
wherein the interference signal receiving section calculates the interference wave receiving antenna weight that maximizes an interference wave power, by using a correlation matrix that is obtained from a receiving signal in a predetermined time.

15. A radio communication device, comprising:
an interference signal receiving section which receives an interference signal containing an interference wave component by using an interference wave receiving antenna weight for receiving selectively a signal of the interference wave component;
an interference wave level detecting section which detects a signal level of the interference wave component from an output of the interference signal receiving section; and
a signal separating section which changes a desired wave separating/receiving antenna weight used to receive a desired signal, based on the output of the interference signal receiving section,
wherein the interference signal receiving section decides one or plural interference wave receiving antenna weights based on a received result of the communication signal between the radio communication devices except a concerned radio communication device at a time of non-communication of the concerned radio communication device.

16. A radio communication device, comprising:
an interference signal receiving section which receives an interference signal containing an interference wave component by using an interference wave receiving antenna weight for receiving selectively a signal of the interference wave component;
an interference wave level detecting section which detects a signal level of the interference wave component from an output of the interference signal receiving section;
a signal separating section which changes a desired wave separating/receiving antenna weight used to receive a desired signal, based on the output of the interference signal receiving section; and
a storing section which stores interference wave receiving information to receive selectively the interference signal,
wherein, when the receiving signal is a signal addressed to the radio communication device except the concerned radio communication device, the interference signal receiving section calculates the interference wave receiving information relating to the interference wave component and stores the information in the storing section.

17. The radio communication device according to claim 16, wherein the interference signal receiving section calculates an interference correlation matrix of the interference wave as the interference wave receiving information, and receives the interference signal by using the interference wave receiving antenna weight generated based on the interference correlation matrix.

18. The radio communication device according to claim 17, wherein, when the receiving signal is a signal addressed to the concerned radio communication device, the signal separating section separates the desired signal by using the desired wave separating/receiving antenna weight generated based on the interference correlation matrix.

19. The radio communication device according to claim 17, wherein the storing section stores the interference correlation matrix of the interference wave individually or the interference correlation matrix classified every sender individually, as the interference wave receiving information.

20. A radio communication device, comprising:
an interference signal receiving section which receives an interference signal containing an interference wave component by using an interference wave receiving antenna weight for receiving selectively a signal of the interference wave component;
an interference wave level detecting section which detects a signal level of the interference wave component from an output of the interference signal receiving section;
a signal separating section which changes a desired wave separating/receiving antenna weight used to receive a desired signal, based on the output of the interference signal receiving section;
a transmitted replica generating portion which generates a replica of the transmitting signal based on a received result of the desired signal received by using the desired wave separating/receiving antenna weight;
an interference canceling portion which cancels one desired signal or more from the receiving signal, based on an output of the transmitted replica generating portion;
an iterative decoding weight generating portion which generates an iterative decoding weight to suppress the interference signal, by using a correlation matrix of the interference signal detected by the interference wave level detecting section; and
a second signal separating section which multiplies an output of the interference canceling portion by the iterative decoding weight.

21. A radio communication device, comprising:
an interference signal receiving section which receives an interference signal containing an interference wave component by using an interference wave receiving antenna weight for receiving selectively a signal of the interference wave component;
an interference wave level detecting section which detects a signal level of the interference wave component from an output of the interference signal receiving section;
a signal separating section which changes a desired wave separating/receiving antenna weight used to receive a desired signal, based on the output of the interference signal receiving section;
a transmitted replica generating section which generates a replica of the transmitting signal based on a received result of the desired signal received by using the desired wave separating/receiving antenna weight;

an interference correlation matrix updating section which extracts an interference signal component by canceling all desired signals from the receiving signal based on an output of the transmitted replica generating section, and updates the correlation matrix of the interference signal detected by the interference wave level detecting section;

an iterative decoding weight generating section which generates an iterative decoding weight to suppress the interference signal, by using an output of the interference correlation matrix updating section; and a second signal separating section which multiplies an output of the interference canceling portion by the iterative decoding weight.

* * * * *